(12) United States Patent
Maruta et al.

(10) Patent No.: US 6,236,213 B1
(45) Date of Patent: May 22, 2001

(54) METHOD AND APPARATUS FOR INSPECTING SPARK PLUG WHILE SPARK PLUG IS INSTALLED IN ENGINE

(75) Inventors: Naoyuki Maruta, Toyota; Nobuaki Suzuki, Toyohashi, both of (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/269,936

(22) PCT Filed: Nov. 18, 1997

(86) PCT No.: PCT/JP97/04196

§ 371 Date: Apr. 8, 1999

§ 102(e) Date: Apr. 8, 1999

(87) PCT Pub. No.: WO93/25124

PCT Pub. Date: Jun. 11, 1998

(30) Foreign Application Priority Data

Dec. 6, 1996 (JP) .................................................. 8-326478

(51) Int. Cl.[7] .................................................. F02P 17/22
(52) U.S. Cl. ............................................. 324/393; 324/399
(58) Field of Search .................................... 324/384, 385, 324/393, 399, 402, 378, 556, 398; 73/116, 117.2

(56) References Cited

U.S. PATENT DOCUMENTS

| | | | |
|---|---|---|---|
| 4,004,213 | 1/1977 | Kato et al. | 324/399 |
| 4,825,167 | 4/1989 | Bayba | 324/399 |
| 5,418,461 | * 5/1995 | Maeda et al. | 324/393 |
| 5,491,416 | * 2/1996 | Klimstra et al. | 324/393 |

FOREIGN PATENT DOCUMENTS

| | | |
|---|---|---|
| 0 740 072 | 10/1996 | (EP) . |
| 50-74034 | 6/1975 | (JP) . |
| 5-65865 | 3/1993 | (JP) . |
| WO 93/02286 | 2/1993 | (WO) . |

* cited by examiner

*Primary Examiner*—Safet Metjahic
*Assistant Examiner*—Vincent Q. Nguyen
(74) *Attorney, Agent, or Firm*—Finnegan, Henderson, Farabow, Garrett & Dunner, L.L.P.

(57) ABSTRACT

Method and apparatus for inspecting a spark plug as installed in an engine, for an abnormal size of a discharge gap and cracking of porcelain, based on a shape parameter value Sn (=Vn/Tn) calculated from a voltage parameter value Vn which is an average of primary voltage V1 during a period of substantially inductive discharge, and a time parameter value Tn indicative of the period of the substantially inductive discharge. The inspection for the abnormal discharge gap size is effected with the engine held at rest, while the inspection for the porcelain cracking is effected with the engine controlled by a motor so as to increase air pressure within the cylinder bore, contrary to conventional system wherein the inspection is effected during operation of the engine by combustion of an air-fuel mixture.

21 Claims, 15 Drawing Sheets

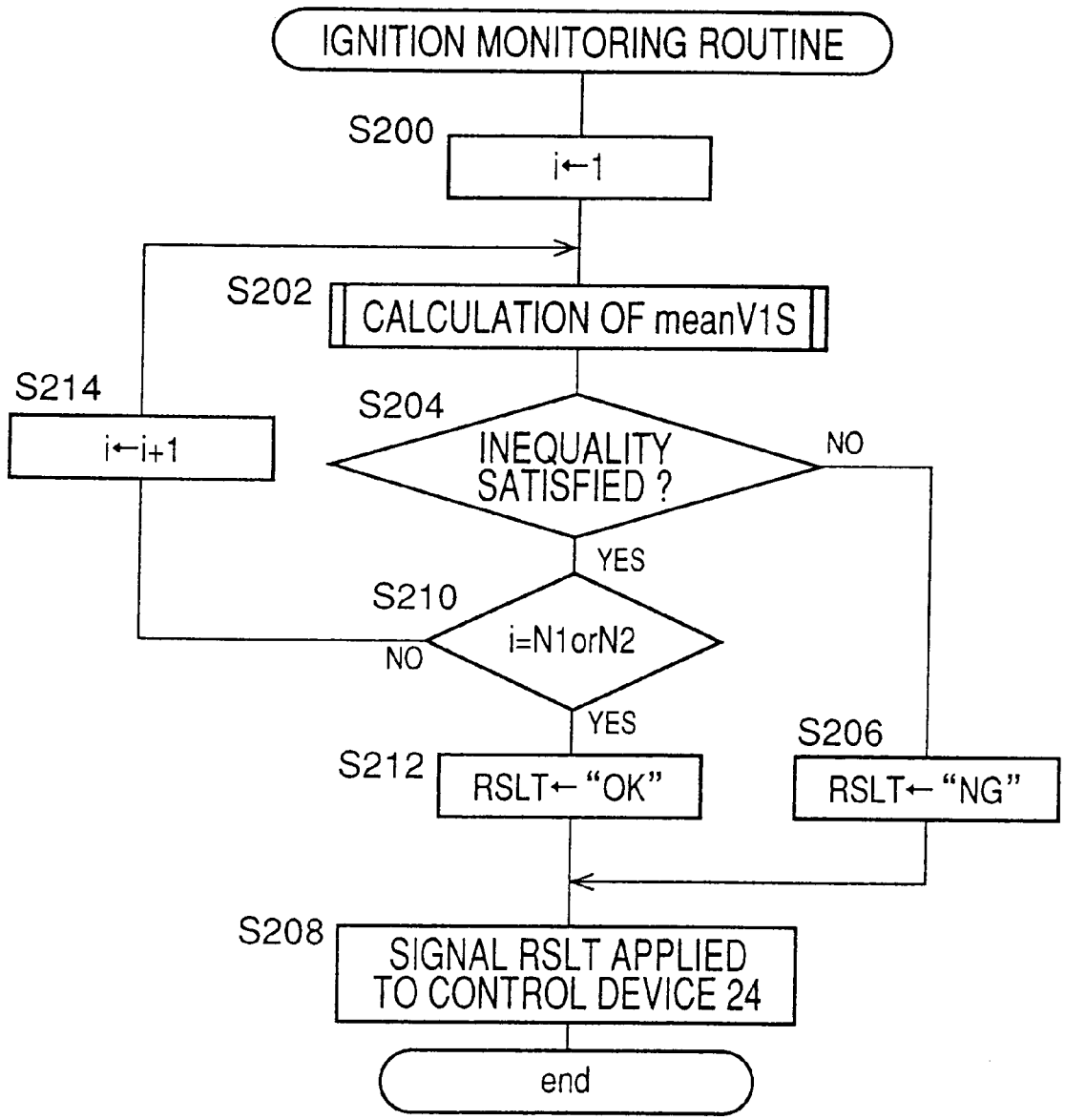

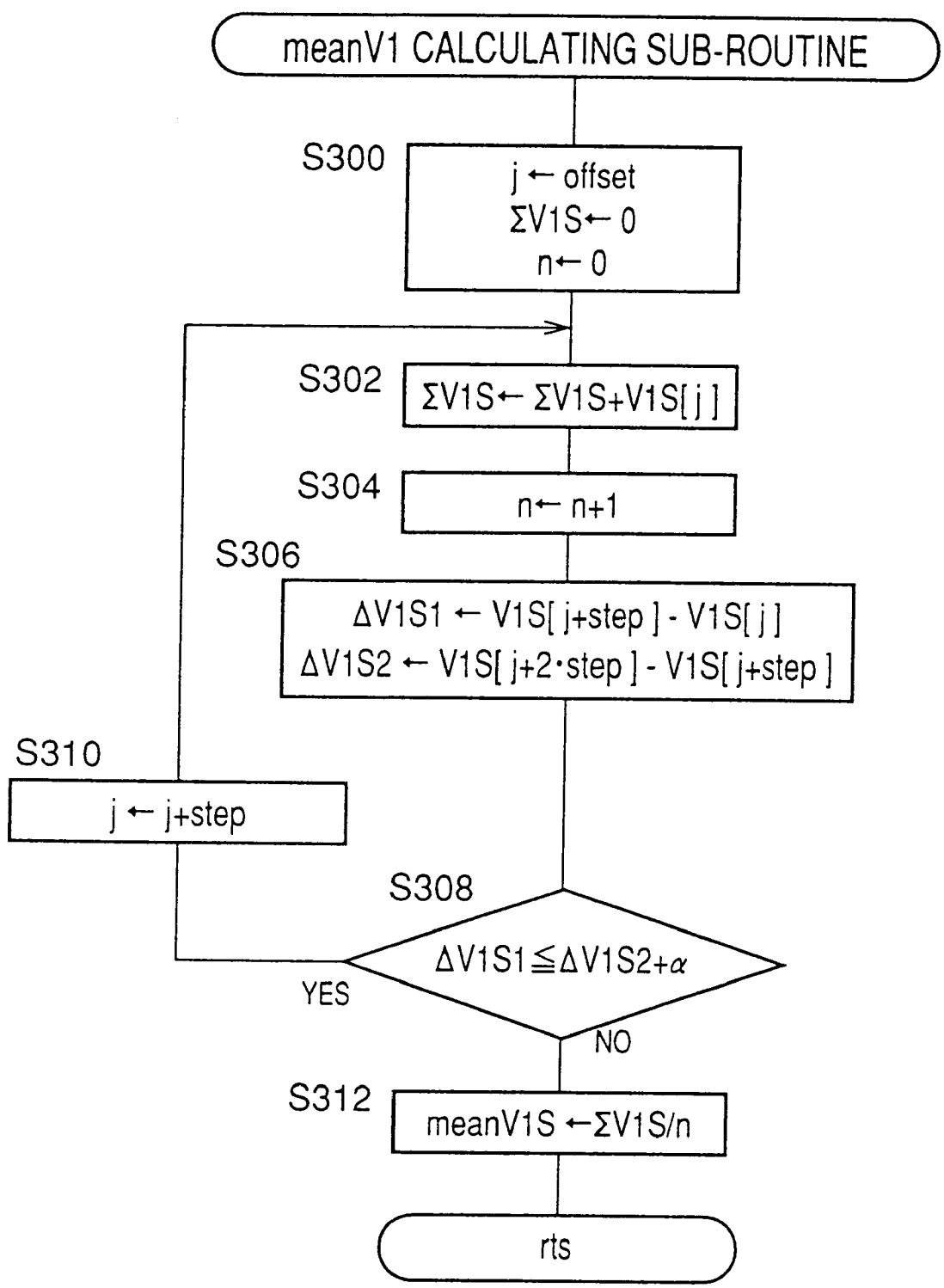

METHOD AND APPARATUS FOR INSPECTING SPARK PLUG WHILE SPARK PLUG IS INSTALLED IN ENGINE

BACKGROUND OF THE INVENTION

1. Field of the Invention

The present invention relates in general to a method and an apparatus for inspecting a spark plug or ignition plug for defects thereof such as defects of a discharge gap and a porcelain thereof, and more particularly to such method and apparatus which permit the inspection of the spark plug while the spark plug is installed in an engine.

2. Discussion of related Art

Since spark plugs are relatively likely to be defective during installation thereof in an engine, the inspection of the spark plugs is desirably conducted after the installation in the engine. An example of a method of inspecting spark plugs for their discharge gaps while the spark plugs are installed in an engine. According to this inspection method, the secondary voltage of an ignition coil is detected by an exclusive probe while the engine is operated by combustion of an air-fuel mixture, so that the spark plug is inspected for adequacy of the discharge gap based on a time duration of an inductive discharge component of the detected secondary voltage.

This inspection method permits the inspection of the spark plug as installed in the engine. However, this method is a so-called "firing check" in which the engine is operated by combustion of the air-fuel mixture. Further, the method relies on only the time duration of the discharging. Therefore, the conventional inspection method cannot be considered satisfactory. The discharging in the spark plug tends to be influenced by the pressure and the fuel concentration of the air-fuel mixture surrounding the discharge gap of the spark plug. In the firing state of the engine, there exists a relatively strong fluid flow within the cylinder of the engine, which may cause considerable variations in the pressure and fuel concentration around the discharge gap, leading to insufficient accuracy of inspection of the discharge gap.

It is desirable to inspect the spark plug for a defect of the porcelain, as well as for the adequacy of the discharge gap. The conventional inspection method indicated above cannot satisfy this need.

SUMMARY OF THE INVENTION

It is therefore a first object of the present invention to provide a method of inspecting a spark plug, which is improved over the conventional method disclosed in JP-A-50-74034.

A second object of the invention is to provide an apparatus suitable for practicing the method of the invention.

The first object indicated above may be achieved according to any one of the following features of the present invention, which are numbered to indicate possible combinations of the features:

(1) A method of inspecting a spark plug while the spark plug is installed in an engine, characterized in that a state of the spark plug is determined on the basis of at least one voltage-related quantity relating to a voltage which is applied to the spark plug without the engine being supplied with a fuel, such that a level of the voltage is high enough to cause the spark plug to generate a spark.

The present method may be practiced while the pressure within a cylinder of the engine for which the spark plug is provided is maintained at the atmospheric pressure or at a level higher than the atmospheric pressure. Further, the method may be practiced while the engine is held at rest or operated by an external drive device. The operation of the engine by the external drive device is performed, without a fuel being supplied to the engine, namely, without firing of the engine, so as to raise the cylinder pressure at which the engine is fired during normal operation by combustion of the fuel. The inspecting apparatus for practicing the present method may be adapted to utilize the ignition system of the engine per se. However, where the inspection of the spark plug is effected by simply raising the cylinder pressure of the engine, this may be accomplished by closing at least one of the intake and exhaust ports and introducing a compressed gas such as compressed air into the cylinder through the closed port.

In any of the above cases, the inspection is effected without the engine being supplied with a fuel, whereby the inspection would not be influenced by the fuel concentration of the air-fuel mixture. Further, since the engine is held at rest or operated by the external drive device without firing thereof, the amount of flow of the fluid within the cylinder is made smaller than where the inspection is effected with the engine being fired, so that the pressure variation in the vicinity of the discharge gap of the spark plug is reduced, resulting in an improvement in the accuracy of inspection of the spark plug for the discharge gap size, and leading to enhanced reliability of the inspection.

For inspecting the spark plug, it may be energized with a secondary voltage which is generated by a voltage applying device on the basis of a primary voltage lower than the secondary voltage. In this case, the above-indicated at least one voltage-related quantity may consist of at least one of the primary and secondary voltages and a time duration of a discharge which occurs on the energized spark plug. This arrangement utilizing the two or more kinds of information permits a further improvement in the inspection reliability. Even where the inspection is based on at least one of the primary and secondary voltages, without utilizing the discharge time duration, the number of kinds of the information that can be utilized for the inspection is larger than where the inspection is based on only the discharge time duration. For instance, the voltage information may include an average of the primary or secondary voltage, a rate of change of the voltage and a waveform of the voltage.

(2) A method of inspecting a spark plug while the spark plug is installed in an engine, characterized in that the spark plug is energized with a secondary voltage which is generated by a voltage applying device on the basis of a primary voltage lower than said secondary voltage, such that a level of said secondary voltage is high enough to cause the spark plug to generate a spark, and that a state of the spark plug is determined on the basis of at least one of the primary and secondary voltages.

In the method according to the feature (2) of the invention which utilizes at least one of the primary and secondary voltages, the number of kinds of the information on which the inspection is effected is larger than where the inspection is based on only the discharge time duration, as described above with respect to the feature (1) of the invention. Accordingly, the inspection reliability is improved. However, it is to be understood that the method according to the present feature (2) does not exclude the inspection while the engine is fired by combustion of a fuel, and the inspection which utilizes the discharge time duration as well as the at least one of the primary and secondary voltages.

(3) A method according to the above feature (1) or (2), wherein the spark plug is energized by application of the primary voltage or secondary voltage thereto while the engine is operated by an external drive device.

(4) A method according to any one of the above features (1)–(3), wherein the spark plug is energized by application of the primary voltage or secondary voltage thereto while the engine is held at rest.

The method according to the features (3) and (4) may include a step of inspecting the spark plug while the engine is held at rest, and a step of inspecting the spark plug while the engine is operated. Since a relatively large number of kinds of information may be obtained while the engine is held at rest and while the engine is operated, the number of items of the inspection may be increased, and the inspection reliability is accordingly improved.

(5) A method according to any one of the above features (1)–(4), wherein the spark plug is energized by application of the primary voltage or secondary voltage thereto while a pressure in a cylinder of the engine for which the spark plug is provided is held at an atmospheric level.

The method according to this feature (5) includes a step of inspecting the spark plug while the engine is held at rest with the cylinder pressure maintained at the atmospheric pressure. However, the method may include a step of inspecting the spark plug with the engine being operated by an external drive device while at least one of the intake and exhaust valves of the engine is held open. This step may be performed by utilizing the ignition system of the engine per se, as a part of the inspection apparatus. In this case, the ignition system may be inspected for any abnormality, without an influence of a variation of the pressure within the cylinder of the engine.

(6) A method according to any one of the features (1)–(5), wherein the spark plug is energized by application of the primary voltage or secondary voltage thereto while a pressure in a cylinder of the engine for which the spark plug is provided is held at a level higher than an atmospheric pressure.

The method according to the features (5) and (6) may include a step of inspecting the spark plug while the pressure in the cylinder is held at the atmospheric level, and a step of inspecting the spark plug while the pressure is held at an elevated level higher than the atmospheric pressure. In this case, a relatively large number of kinds of information may be obtained while the cylinder pressure is held at the atmospheric level and at the elevated level, so that the number of items of the inspection may be increased, whereby the inspection reliability is accordingly improved. For instance, the spark plug may be inspected for a defect of the discharge gap while the cylinder pressure is held at the atmospheric level, and for a defect of the porcelain structure while the cylinder pressure is held at a level higher than the atmospheric level.

(7) A method according to the above feature (6), wherein the pressure in the cylinder is substantially equal to a pressure in the cylinder when an air-fuel mixture in the cylinder is ignited by combustion of a fuel during normal operation of the engine.

(8) A method according to any one of the above features (1) and (3)–(7), wherein the spark plug is energized with a secondary voltage which is generated by a voltage applying device on the basis of a primary voltage lower than the primary voltage, and the at least one voltage-related quantity consists of at least one of the primary and secondary voltages.

(9) A method according to the above feature (2), wherein the at least one of the primary and secondary voltages is detected while the engine is operated by combustion of a fuel.

(10) A method according to any one of the above features (1)–(9), wherein the state of the spark plug is determined also on the basis of a time duration of a discharge which occurs on the spark plug energized to produce the spark.

(11) A method according to the feature (10), wherein the state of the spark plug is determined on the basis of a ratio of an average of the above-indicated at least one of the primary and secondary voltages to the time duration of the discharge.

The second object indicated above may be achieved according to another aspect of the invention, which provides an apparatus for inspecting a spark plug while the spark plug is installed in an engine and while the engine is not supplied with a fuel, the apparatus comprising: (a) a voltage applying device for applying to the spark plug a voltage which is high enough to cause the spark plug to generate a spark; and (b) a monitoring device for detecting at least one voltage-related quantity relating to the voltage, and determining a state of the spark plug on the basis of the detected at least one voltage-related quantity.

The second object may also be achieved according to a further aspect of the invention, which provides an apparatus for inspecting a spark plug while the spark plug is installed in an engine, the apparatus comprising: (a) a voltage applying device for applying to the spark plug a secondary voltage which is generated on the basis of a primary voltage lower than the secondary voltage such that a level of the secondary voltage is high enough to cause the spark plug to generate a spark; and (b) a monitoring device for detecting at least one of the primary and secondary voltages upon application of the secondary voltage to the spark plug, and determining a state of the spark plug on the basis of at least the at least one of the primary and secondary voltages.

BRIEF DESCRIPTION OF DRAWINGS

The above and optional objects, features, advantages and technical and industrial significance of this invention will be better understood by reading the following detailed description of presently preferred embodiments of the invention, when considered in connection with the accompanying drawings, in which:

FIG. 14 is a flow chart illustrating an ignition monitoring routine executed in a further embodiment of the invention, in place of the routine illustrated in the flow chart of FIG. 11; and FIG. 15 is a flow chart illustrating a sub-routine executed in step S202 of the ignition monitoring routine of FIG. 14, for calculating an average primary voltage meanV1S.

DETAILED DESCRIPTION OF THE PREFERRED EMBODIMENTS

There will be described preferred embodiments of a spark plug inspection method of the present invention, together with some arrangements of an inspection system suitable for practicing the method. The inspection system is capable of inspecting the spark plug for defects of the discharge gap and the porcelain, independently of each other, during a process of assembling an engine.

Figure 1A:
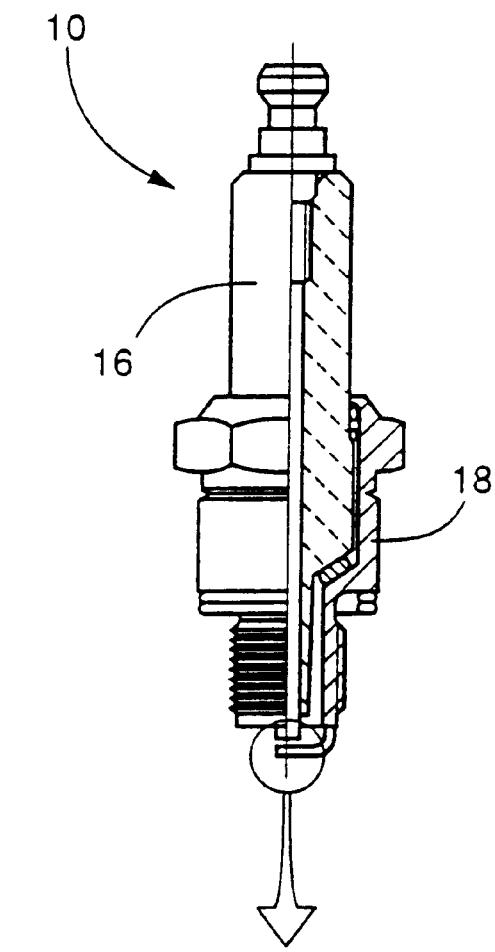
FIG. 1A and 1B are views showing a spark plug without defects of a discharge gap and a porcelain thereof.
Figure 1B:
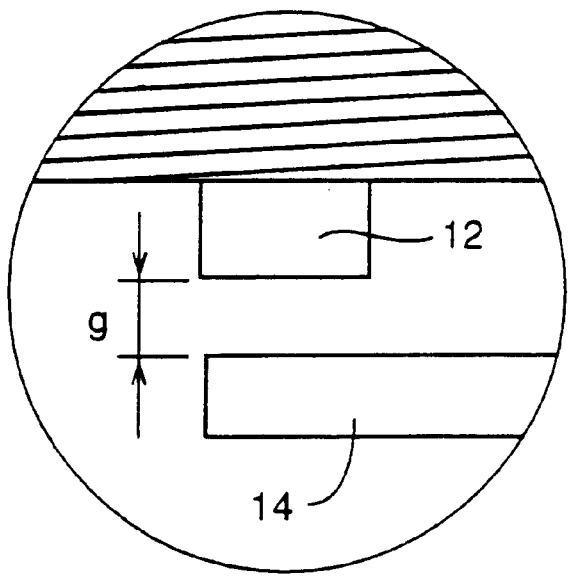

Referring first to FIG. 1A, there is shown a spark plug 10 normally installed in an engine, without any defects of a discharge gap and a porcelain thereof. The discharge gap is a gap formed or defined by and between a center electrode 12 and a grounding electrode 14 of the spark plug 10. In FIG. 1B, there is also provided an enlarged view of a portion of the spark plug 10 in the vicinity of the discharge gap. The size of the discharge gap is indicated at "g" in FIG. 1.

Figure 2A:
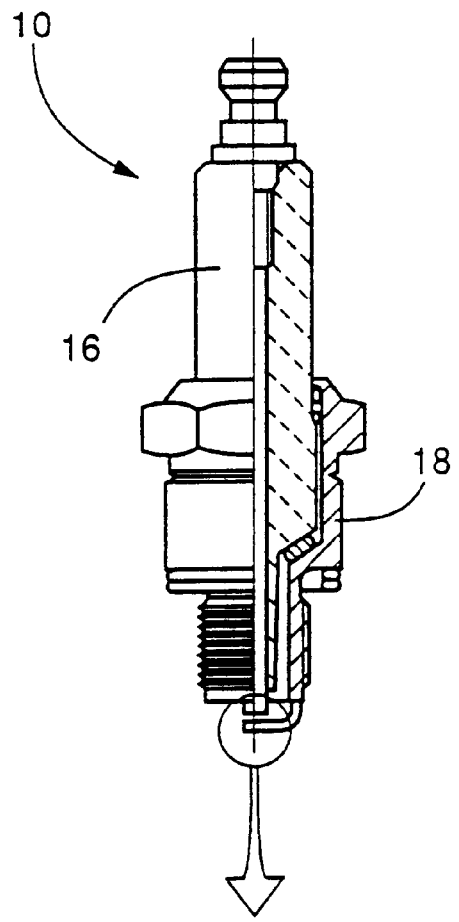
FIG. 2A and 2B are views showing a spark plug with a defect of a discharge gap thereof.
Figure 2B:
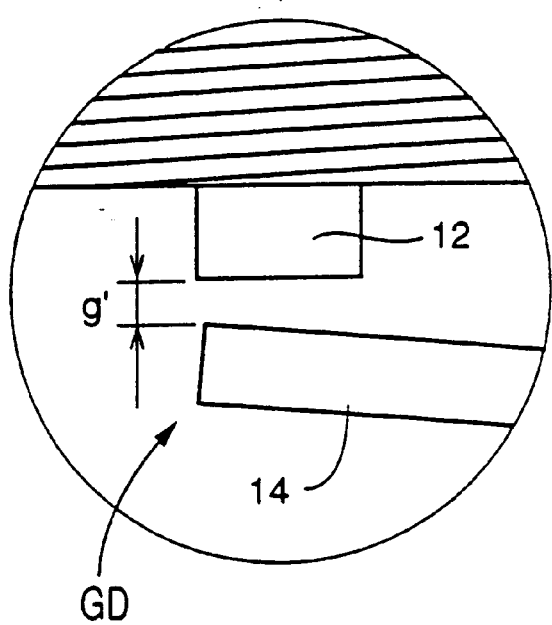

On the other hand, the spark plug 10 shown in FIG. 2A is an example having a defect of the discharge gap. In FIG. 2B, there is also provided an enlarged view of the portion of the spark plug 10 in the vicinity of the discharge gap. The size of the defective discharge gap is indicated at "g'" in FIG. 2. The defect of the discharge gap (hereinafter refereed to as "discharge gap defect" where appropriate) may be caused by plastic deformation of the grounding electrode 14, which may take place due to a fall of the spark plug 10 or collision of the spark plug 10 with the engine upon installation of the spark plug 10 in the engine. In the specific example of FIG. 2, the free end portion of the grounding electrode 13 is located nearer to the center electrode 12 so that the discharge gap g' is smaller than the nominal value g of the normally installed spark plug 10 of FIG. 10. This discharge gap defect is indicated at GD in FIG. 2. The ignition of the compressed air-fuel mixture becomes difficult as the discharge gap decreases, since an insufficient size of the discharge gap does not permit the formation of a nucleus of a flame which is necessary for promotion of the combustion of the air-fuel mixture.

Figure 3:
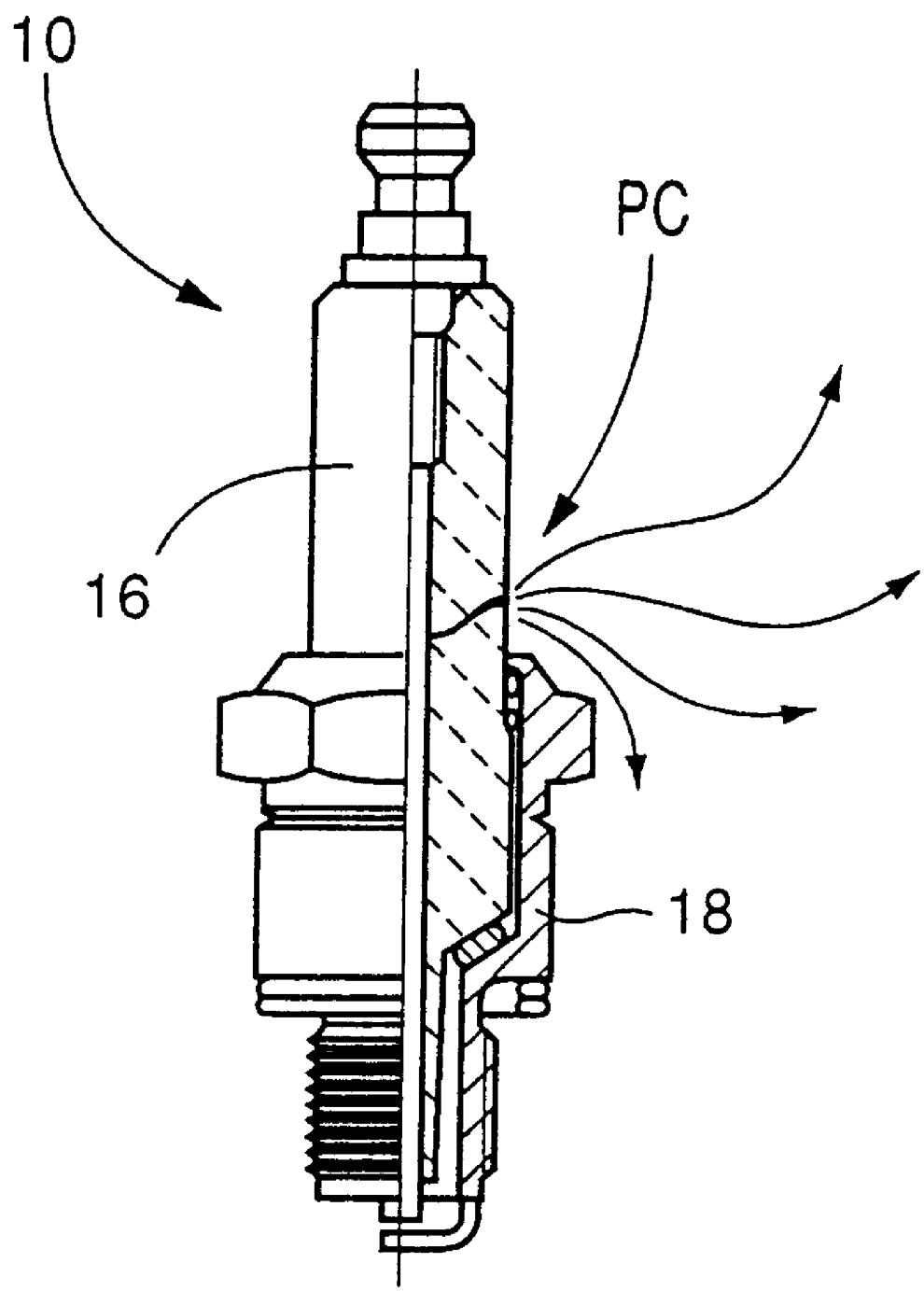
FIG. 3 is a view showing a spark plug with a defect of a porcelain thereof.

The spark plug 10 shown in FIG. 3 is an example having a defect of a porcelain 16, as indicated at PC in the figure. The defect of the porcelain 16 (hereinafter referred to as "porcelain defect", wherein appropriate) may be pin holes or cracks formed in the porcelain 16, which is provided for insulation between the center and grounding electrodes 12, 14. While most of the pin holes are formed during manufacture of the porcelain 16, the cracking may occur not only during manufacture of the porcelain 16 but also due to a fall of the spark plug 10, or collision of the porcelain 16 with the engine or an excessively large force acting on the porcelain 16 during installation of the spark plug 16 in the engine. If the pin holes or cracks have a relatively large size, the engine may suffer from an energy loss. In this respect, it is noted that a shell 18 of the spark plug 10 as installed in the engine is grounded like the grounding electrode 14, so that a discharge or sparking may take place between the center electrode 12 and the shell 18, in the presence of the pin holes or cracks in the porcelain 16, as described below. This is a typical example of the porcelain defect.

Figure 4:
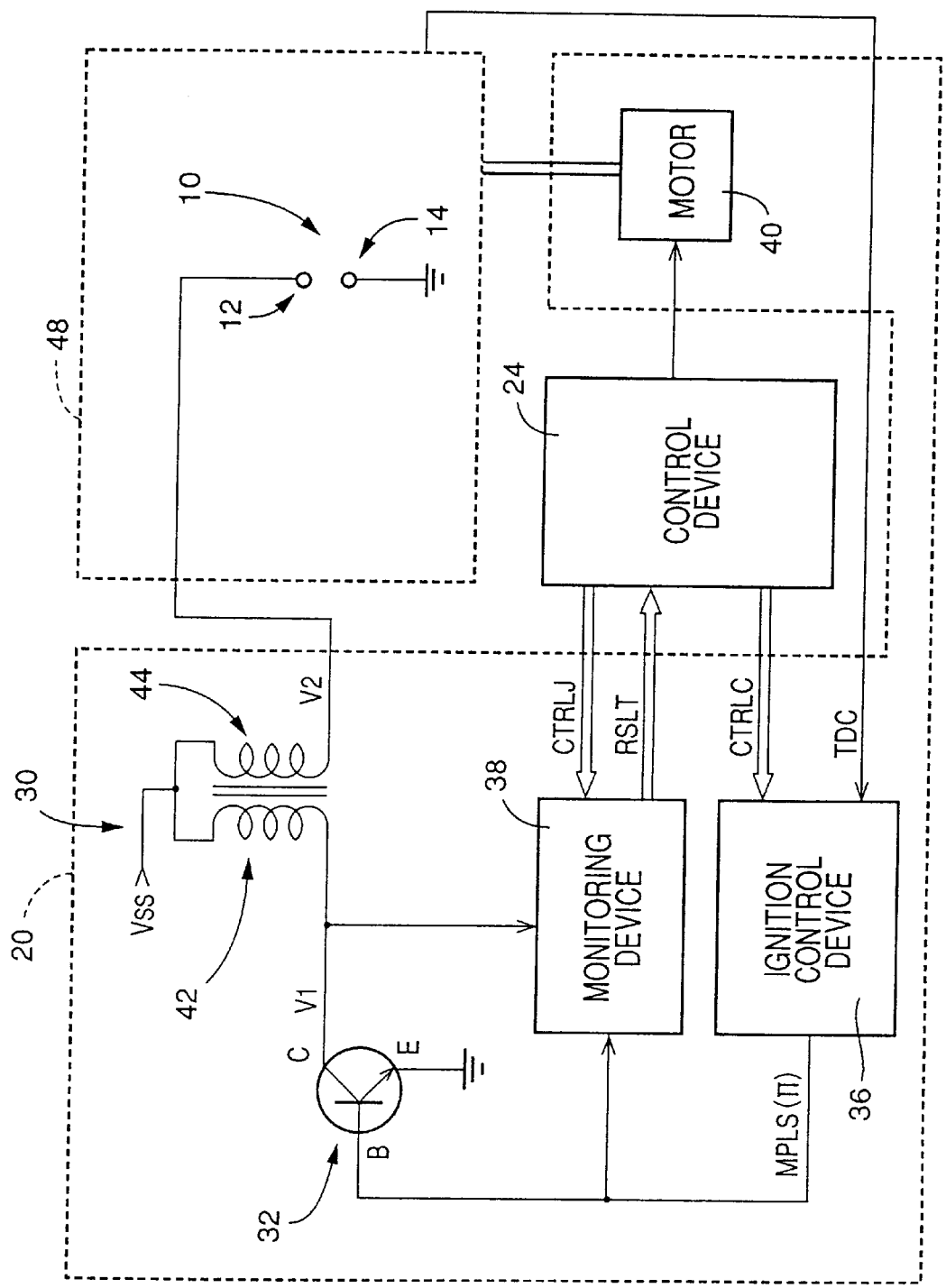
FIG. 4 is a schematic block diagram schematically showing an inspection system used for practicing a spark plug according to one embodiment of this invention.

Referring next to the schematic block diagram of FIG. 4, there is schematically illustrated an inspection system capable of inspecting the spark plug 10 for the discharge gap defect and the porcelain defect, independently of each other. The independent inspection of the discharge gap and porcelain defects mean that the inspection of the spark plug 10 for the discharge gap can be achieved irrespective of the presence or absence of the porcelain defect, while the inspection of the spark plug 10 for the porcelain defect can be achieved irrespective of the presence or absence of the discharge gap defect. The present inspection system includes an inspecting device 20 and a control device 24 as major components thereof. The inspecting device 20 includes an ignition coil 30, a transistor 32, an ignition control device 36, a monitoring device 38 and a motor 40.

The ignition coil 30 has a primary coil 42 and a secondary coil 44. One end of the coil 30 and one end of the coil 42 are connected to each other and to a voltage source (which provides a line voltage Vss). While only one set of the transistor 32, ignition coil 30 and spark plug 10 is shown in FIG. 4, an engine 48 to be inspected by the present inspection system has a plurality of sets of these components 32, 30, 10 which correspond to respective cylinders of the engine.

The other end of the primary coil 42 is connected to a collector C of the transistor 32. The voltage at the connection between the collector C and the primary coil 42 is a primary voltage V1. The transistor 32 has an emitter E connected to the ground, and a base B connected to the ignition control device 36 and the monitoring device 38. The other end of the secondary coil 44 is connected through a high voltage wire to the center electrode 12 of the spark plug 10. The voltage at the connection between the secondary coil 44 and the center electrode 12 is a secondary voltage V2. With this secondary voltage V2 applied across the electrodes 12, 14, a discharge takes place at the discharge gap of the spark plug 10, namely, a spark jumps across the discharge gap. It will be understood that the ignition coil 30, the transistor 32 and the ignition control device 36 cooperate to constitute a voltage applying device for energizing the spark plug 10 by application of the secondary voltage V2.

The control device 24 is adapted to apply control signals CTRLC and CTRLJ to the ignition control device 36 and the monitoring device 38. Each of these control signals CTRLC, CTRLJ has two kinds. That is, the signal CTRLC has a first and a second control signal CTRLC1 and CTRLC2, while the signal CTRLJ has a first and a second control signal CTRLJ1 and CTRLJ2. The first control signals CTRLC1, CTRLJ1 are applied to the devices 36, 38, respectively, to inspect the spark plug 10 for the discharge gap defect, while the second control signals CTRLC2 and CTRLJ2 are applied to the devices 36, 38, respectively, to inspect the spark plug 10 for the porcelain defect. The application of the first control signals CTRLC1, CTRLJ1 will be first explained. The control device 24 is adapted to apply the first control signal CTRLC1 to the ignition control device 36 for inspecting the spark plug 10 for the discharge gap defect.

In the engine 48 to be inspected by the present inspection system, the numbers of the transistors 32 and the ignition coils 30 are the same as the number of the ignition plugs 10. However, some engine has only one transistor 32 and only one ignition coil 30. For instance, an engine may have a distributor for connecting the secondary coil 44 of the same one ignition coil 30 selectively to the center electrodes 12 of the plurality of spark plugs 10. In this type of engine, the center electrodes 12 of the spark plugs 10 may be selectively connected to the secondary coil 44 of the ignition coil 30 through high-voltage ignition point relays or solid state relays corresponding to the spark plugs 10, so that a selected one of the spark plugs 10 which is to be inspected can be energized to cause a spark by electrically controlling the states of the ignition point relays or solid state relays.

Upon reception of the first control signal CTRLC1 from the control device 24, the ignition control device 36 immediately applies a rectangular pulse MPLS to the base B of the transistor 32 and the monitoring device 38. At this time, the engine 48 is controlled such that at least one of the intake and exhaust valves of the cylinder provided with the spark plug 10 corresponding to the transistor 32 to which the rectangular pulse MPLS is applied is placed in an open position in which the pressure around the discharge gap is made equal to the atmospheric pressure. This control of the engine 48 is accomplished by operation of the motor 40. The motor 40 is preferably equipped with a servo mechanism that permits the angular position of the crankshaft of the engine 48 to be changed as needed. The rectangular pulse MPLS is applied to only a selected one of the transistors 32 corresponding to the engine cylinders. This selected transistor 32 corresponds to the spark plug 10 to be inspected, which is shown in FIG. 4 by way of example. In other words, the spark plug 10 corresponding to the transistor 32 to which the rectangular pulse MPLS is applied is inspected for the discharge defect.

Figure 5:
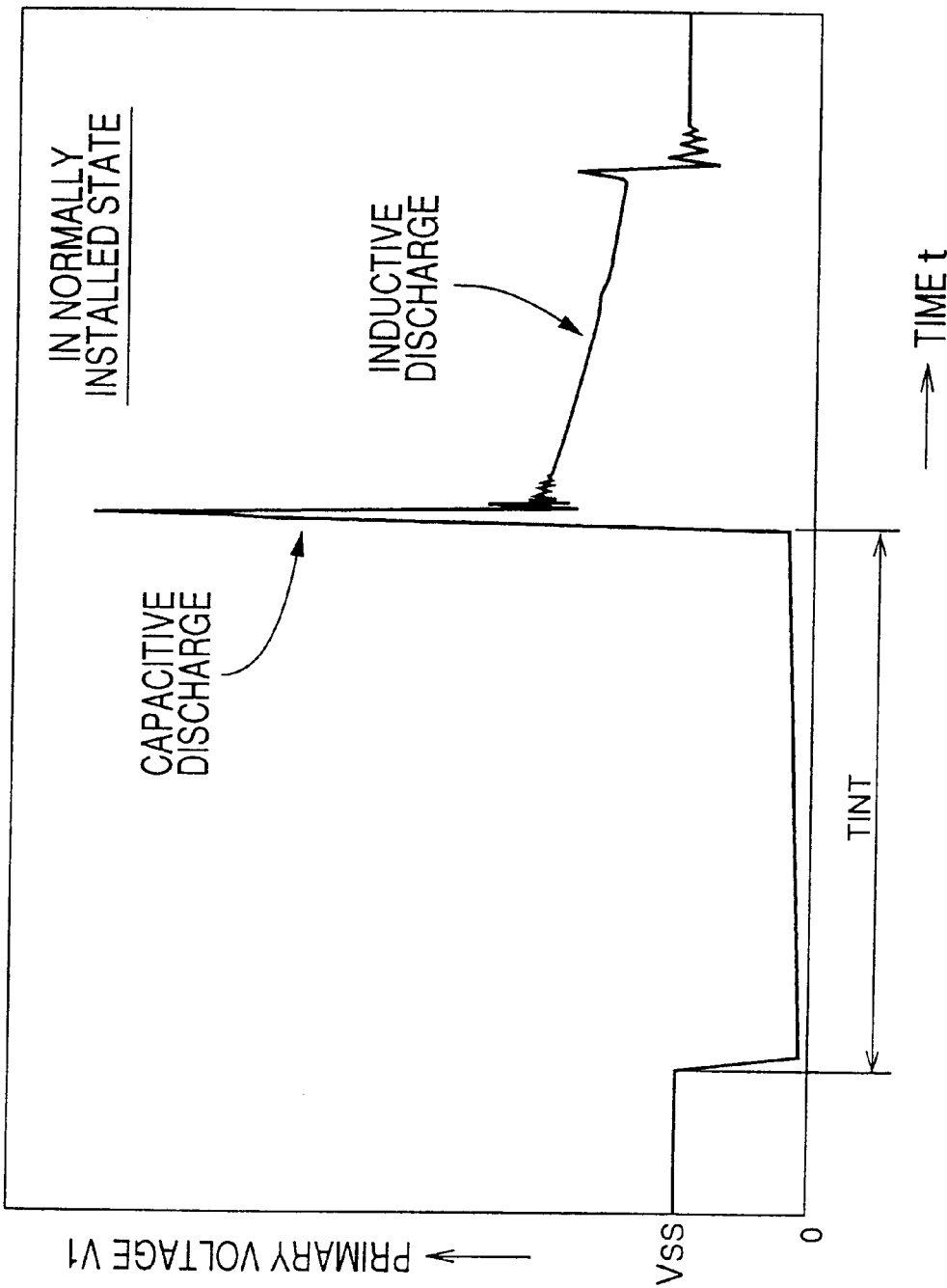
FIG. 5 is a graph indicating a relationship between a capacitive discharge and an inductive discharge in a waveform of a primary voltage obtained by the inspection system of FIG. 4.

For inspecting all of the spark plugs 10, the rectangular pulse MPLS must be applied to the corresponding transistors 32. On the other hand, the monitoring device 38 receives the rectangular pulse MPLS when this pulse is applied to each of the transistors 32. The function of the monitoring device 38 will be described. When the rectangular pulse MPLS is applied to the base B of the transistor 32, the transistor 32 is placed in a closed state and held in this closed state for a time duration TINT which corresponds to a width of the pulse MPLS. Upon expiration of the time duration TINT, the transistor 32 is returned to an open state. As a result, the primary voltage V1 changes to exhibit a complicated waveform as indicated in FIG. 5. The waveform of FIG. 5 is a waveform of the primary voltage V1 when the spark plug 10 is normally installed in the engine 48 in the absence of both the discharge gap defect and the porcelain defect. Waveforms of the primary voltage V1 in the presence of the discharge gap defect or the porcelain defect will be described below.

As discussed below, the inspection method according to the present embodiment of the invention is formulated to inspect the spark plug 10 on the basis of a variation of the primary voltage V1 after the expiration of the time duration TINT. Since the absolute value of the secondary voltage V2 is substantially proportional to that of the primary voltage V1 after the expiration of the time duration TINT, the inspection may be achieved on the basis of the secondary voltage V2, with substantially the same accuracy. However, the secondary voltage V2 is usually as high as 10,000 volts or higher, requiring a voltage measuring device to have an accordingly high resistance to voltage, and resulting in increased complexity of the arrangement of the inspection system and accordingly increased cost of manufacture of the system. In the light of this fact, the present embodiment is adapted to effect the inspection on the basis of the primary voltage V1.

An electromagnetic energy stored in the primary coil 42 during the time duration TINT is consumed after the expiration of the time duration TINT, primarily for discharging or sparking at the discharge gap of the spark plug 10. Initially, a so-called "capacitive discharge" takes place as indicated in FIG. 5. This capacitive discharge causes the secondary circuit to be formed on the secondary side of the ignition coil 30. The voltage required for initiating the capacitive discharge is a voltage (initial breakdown voltage) which is high enough to initiate the discharge before the formation of the secondary circuit. Upon initiation of the capacitive discharge as indicated by the waveform in FIG. 5, the secondary voltage V2 instantaneously rises, since the secondary voltage V2 is substantially proportional to the primary voltage V1, as described above, owing to the step-up transformer connection of the primary and second coils 42, 44 of the ignition coil 30. Therefore, the waveform of the secondary voltage V2 can be approximated by observing the waveform of the primary voltage V1 indicated in FIG. 5, except a portion of the waveform during the time duration TINT.

Following the capacitive discharge, a so-called "inductive discharge" occurs. This inductive discharge is initiated after the secondary circuit has been formed by the capacitive discharge. Accordingly, the primary voltage V1 is lower during the inductive discharge than during the capacitive discharge. Since the electromagnetic energy gradually decreases in the process of the inductive discharge, the detected primary voltage V1 also gradually decreases during the inductive discharge. In the last stage of the inductive discharge, the detected primary voltage V1 again increases for a relatively short time, as also indicated in FIG. 5. In this respect, it is noted that the secondary circuit which was formed by the capacitive discharge and has been kept during the inductive discharge tends to be unstable with a decrease in the inductive discharge energy. Accordingly, an increase in the secondary voltage V2 is required to hold the capacitive discharge, whereby the above-indicate increase in the primary voltage V1 takes place. Upon termination of the inductive discharge, the primary and secondary voltages V1, V2 are both lowered to the line voltage Vss.

Upon reception of the first control signal CTRLC1 from the control device 24, the monitoring device 38 determines whether the spark plug 10 suffers from a discharge gap defect or not. This determination is effected based on the detected primary voltage V1. The monitoring device 38 applies to the control device 24 a signal RSLT indicative of a result of the determination, as described below.

Figure 6:
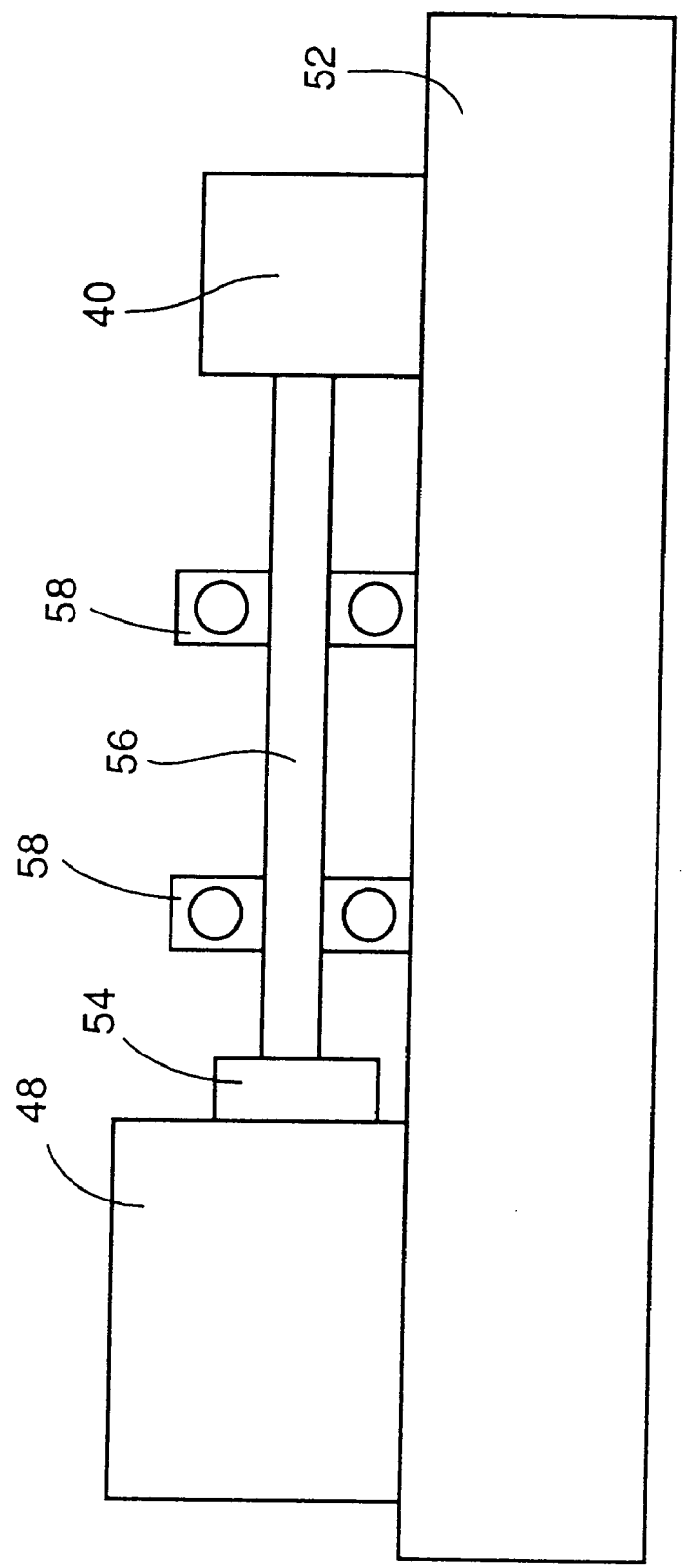
FIG. 6 is a front elevational view schematically showing an entire arrangement of the inspection system.

The second control signals CTRLC2 and CTRLJ2 are applied from the control device 24 to the ignition control device 36 and the monitoring device 38, respectively, for inspecting the spark plug 10 for the porcelain defect. When these second control signals CTRLC2, CTRLJ2 are generated from the control device 24, the motor 40 is operated at a predetermined constant speed. As shown in FIG. 6, the engine 48 to be inspected and the motor 40 are mounted on a base 52, and the crankshaft of the engine 48 is connected to the drive shaft of the motor 40 through a coupling 54 and a drive shaft 56. The drive shaft 56 is rotatably supported by two bearings 58 such that the drive shaft 56 is not axially movable. It will be understood that the motor 40, base 52, coupling 54 and drive shaft 56 constitute a major portion of an external drive device for operating the engine 48. Thus, the inspection of the spark plug 10 for the porcelain defect is achieved by so-called "motoring" of the engine 48 by operation of the motor 40, which should be distinguished from the so-called "firing" of the engine 48 by combustion of the air-fuel mixture.

Upon reception of the second control signal CTRLC2 from the control device 24, the ignition control device 36 generates the rectangular pulse MPLS each time the device 36 receives a TOP DEAD CENTER signal TDC from the engine 48. The device 36 generates the rectangular pulse MPLS at a timing which is determined by the moment of generation of the signal TDC, the speed of rotation of the crankshaft of the engine 48 by the motor 40, and the position of the cylinder equipped with the spark plug 10 to be inspected. This timing is determined so that the pressure in the cylinder in question is increased to a level substantially equal to the maximum value. The TOP DEAD CENTER signal TDC is produced from a crank angle sensor for detecting the angular position of the crankshaft of the engine 48. In the present embodiment, the ignition control device 36 receives the signal TDC each time the crankshaft is rotated through 360° or by one full turn. The above-indicated timing is determined so that the rectangular pulse MPLS is generated when the piston of the cylinder equipped with the spark plug 10 to be inspected is located at the top dead center or in the vicinity thereof while the intake and exhaust valves are both closed.

Figure 7:
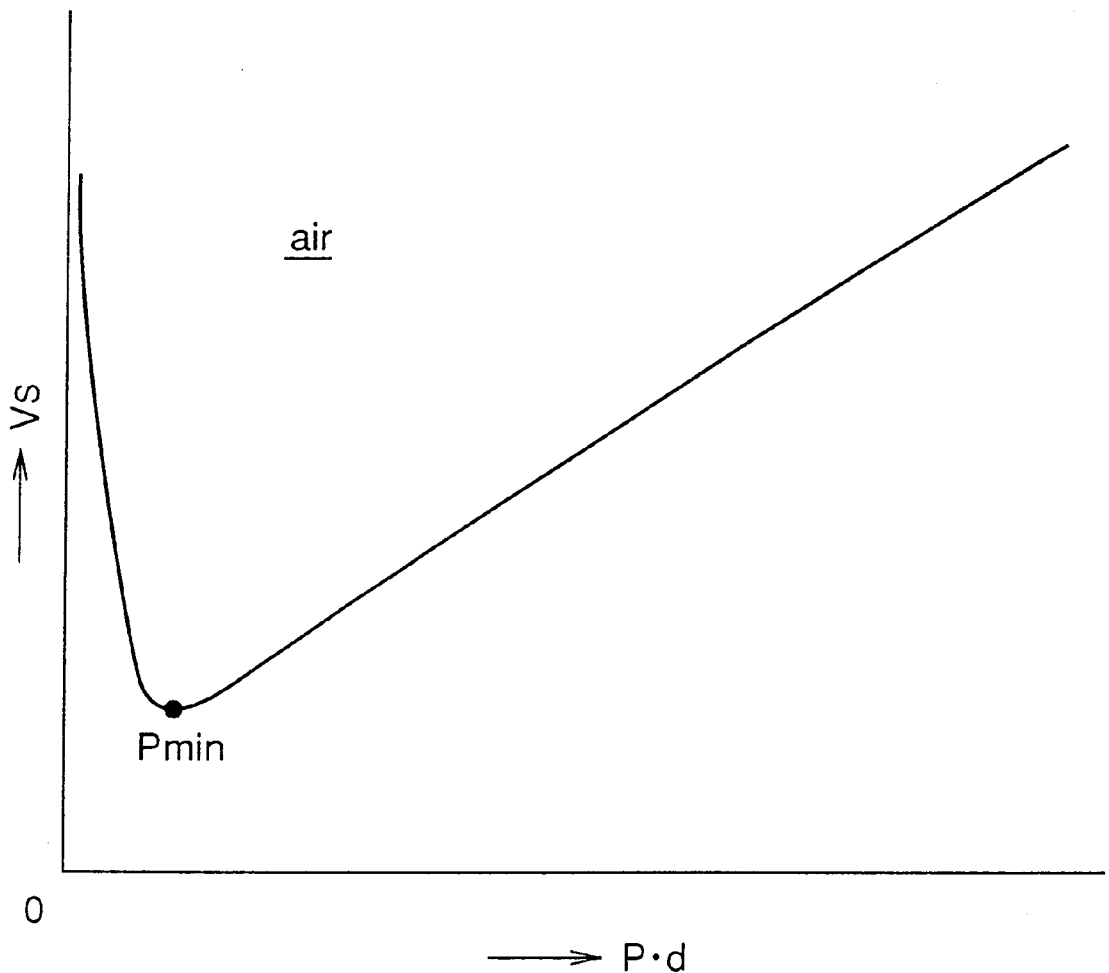
FIG. 7 is a graph indicating a general relationship (Paschen's law) among the size of a gap between two parallel electrodes, ambient air pressure and an electrode potential at which sparking is initiated.

The generation of the pulse MPLS for inspection of the spark plug 10 for the porcelain defect when the cylinder piston is located at or near the top dead center is intended to increase the fluid pressure in the vicinity of the discharge gap of the spark plug 10. Generally, the potential (hereinafter referred to as "sparking voltage Vs") between two electrodes in a gas, which is required to initiate sparking (generate or create a spark) across the electrodes, is influenced by the pressure of the gas. This phenomenon is known as "Paschen's law" (Paschen's rule), which is indicated by a graph of FIG. 7 in the case where the gas is the air. In the graph of FIG. 7, a product p·d is taken along the horizontal axis while the sparking voltage Vs is taken along the vertical axis. The value "p" is the pressure of the air, while the value p·d is a distance between the center electrode 12 and the grounding electrode 14, namely, the size of the discharge gap. The curve in the graph indicates that the sparking voltage Vs is substantially proportional to the product p·d when the product p·d is larger than a value corresponding to a minimum value Pmin (so-called "Paschen's minimum") of the sparking voltage Vs.

In the case of the air, it is known that the Paschen's minimum Pmin is established when the discharge gap "d" is approximately 8 pm and the sparking voltage Vs is approximately 325V, while the air pressure "p" is equal to the atmospheric pressure. Generally, the discharge gap "d" of the spark plug ranges from 0.6 mm to 1.1 mm, and the air pressure "p" at the time and place of inspection of the spark plug is equal to the atmospheric pressure or higher. Therefore, the product p·d is sufficiently larger than the value corresponding to the Paschen's minimum Pmin. Thus, the Paschen's law may be approximated by the following linear expression (1):

$$Vs = K \cdot p \cdot d + C \quad (1)$$

wherein, K and C are constants, which are positive values in the case of the air.

Since the discharge gap size "d" of the specific spark plug 10 to be inspected is constant, the sparking voltage Vs is theoretically proportional to the air pressure "p".

According to the above expression (1), the sparking cannot take place unless the sparking voltage Vs is suitably increased with an increase in the air pressure "p". The sparking at the discharge gap of the spark plug 10 can be restrained by increasing the air pressure "p" at the discharge gap. Based on this fact, sparking due to the pin holes or cracks in the porcelain 16 can be initiated before the sparking occurs across the discharge gap. That is, the porcelain defect can be detected by increasing the air pressure "p", by the so-called "motoring" indicated above, that is, by bringing the piston of the cylinder in question to or near the top dead center by operating the engine 48 by the motor 40, or by any other suitable method such as introduction of compressed air into the cylinder. However, the "motoring" is desirable where the external drive device including the motor 40 is used to operate the engine 48 for inspecting other elements of the engine 48 than the spark plug 10. The inspection by the "motoring" of the engine 48 using the motor 40 is easier than the inspection by the "firing" of the engine 48 by combustion of an air-fuel mixture. Further, the amount of change in the pressure within the engine cylinder is smaller in the case of the "motoring" than in the case of the "firing", so that the inspection of the engine 48 by the "motoring" can be generally achieved with higher accuracy. In this respect, the inspection of the elements other than the spark plug is usually effected by motoring the engine 48. In this case, the external drive device can be conveniently utilized for inspecting the spark plug 10.

The maximum value of the air pressure "p" is set to be close to a level at which the sparking takes place at the discharge gap in the absence of the porcelain defect. When the spark plug 10 does not have the porcelain defect, the primary voltage V1 detected during the inspection with the "motoring" of the engine 48 has a waveform similar to that shown in FIG. 5 (and FIG. 8 which will be referred to). In this case, the peak of the primary voltage V1 during the capacitive discharge is higher than in the normally installed state of the spark plug without the "motoring", but the change of the primary voltage V1 during the inductive discharge is substantially identical with that in the normally installed state without the "motoring".

Upon reception of the second control signal CTRLJ2 from the control device 24, the monitoring device 38 determines whether the spark plug 10 suffers from a porcelain defect or not. This determination is effected based on the detected primary voltage V1. The monitoring device 38 applies to the control device 24 a signal indicative of a result of the determination, as described below.

Figure 8:
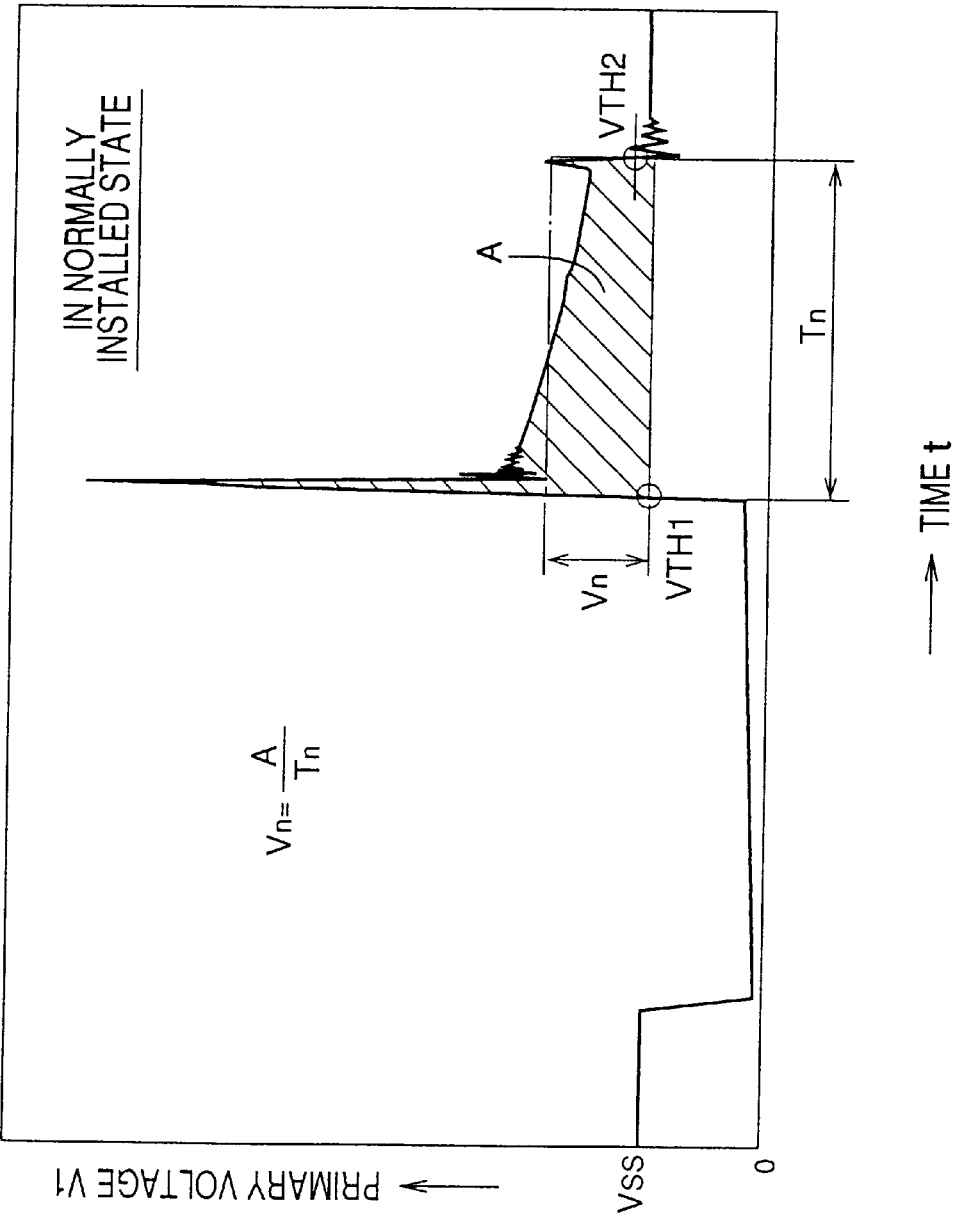
FIG. 8 is a graph indicating a waveform of a primary voltage obtained by the inspection system in a normally installed state of the spark plug.
Figure 9:
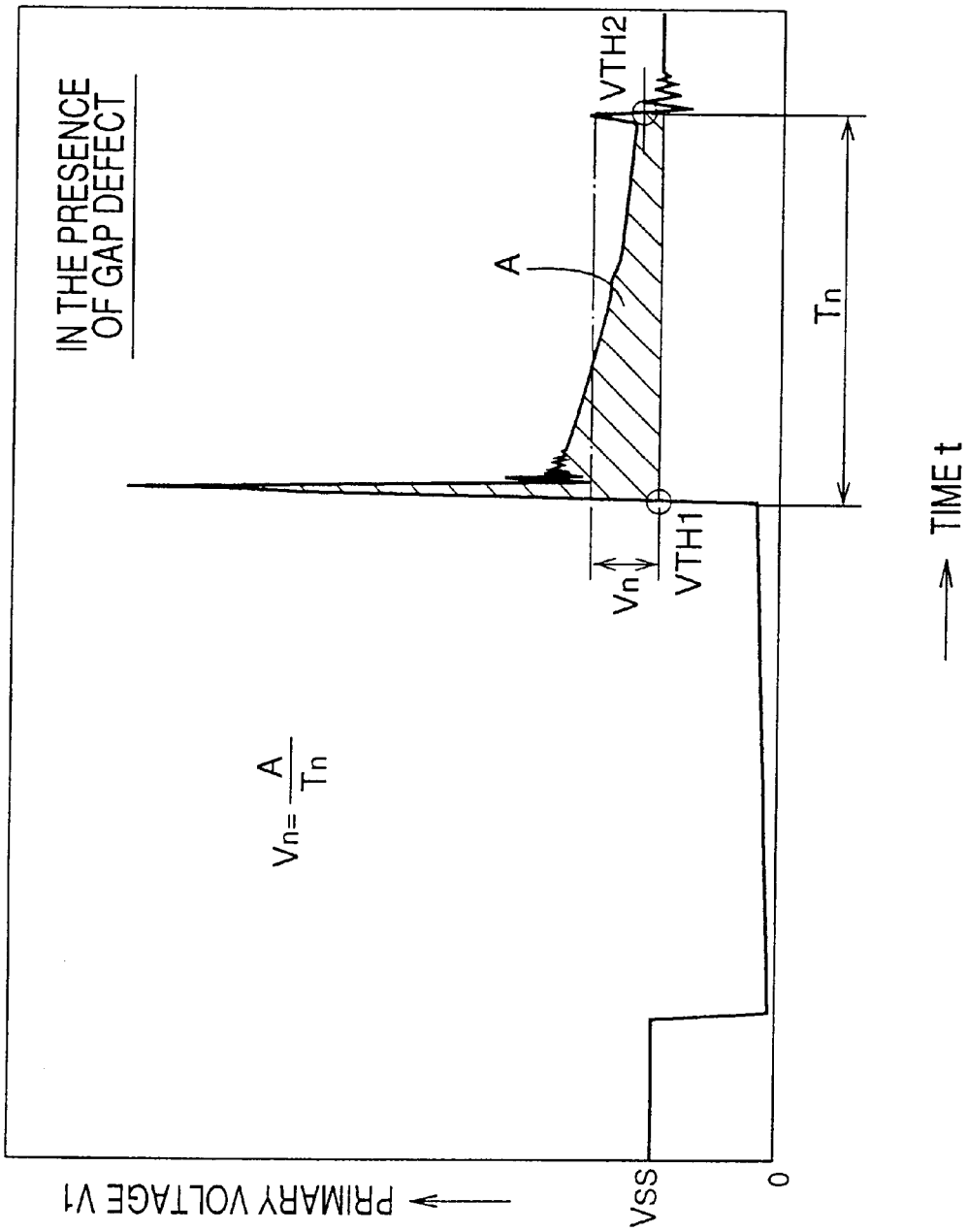
FIG. 9 is a graph indicating a waveform of a primary voltage obtained by the inspection system in the presence of a defect of a discharge gap of the spark plug.
Figure 10:
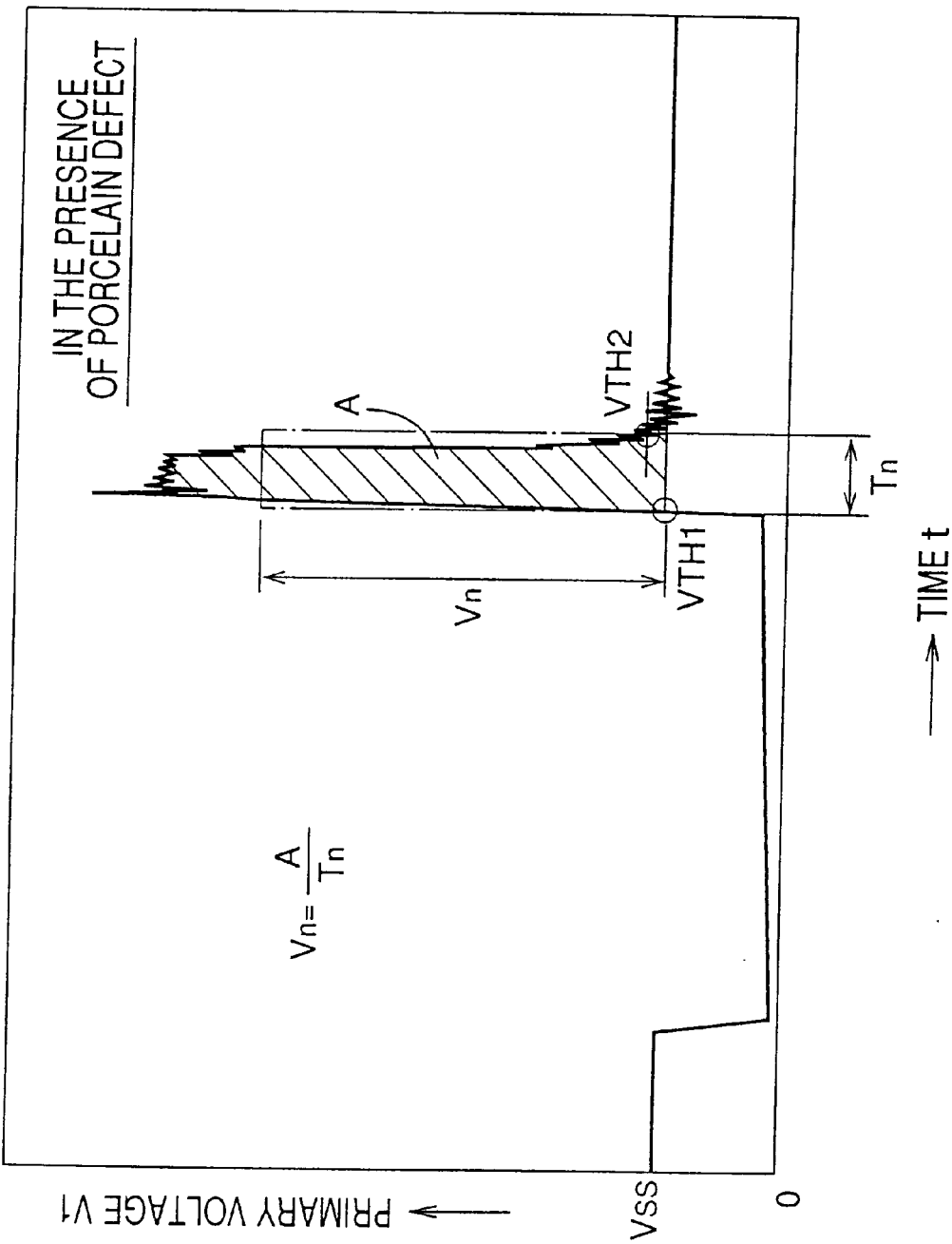
FIG. 10 is a graph indicating a waveform of a primary voltage obtained by the inspection system in the presence of a defect of a porcelain of the spark plug.

Referring to the graphs of FIGS. 8–10, there will be explained the manners of inspecting the spark plug 10 for the discharge gap defect and the porcelain defect. The waveform of the primary voltage V1 shown in FIG. 8 is a waveform obtained in the normally installed state of the spark plug 10 without the "motoring" of the engine 48 (without controlling the air pressure "p" as described above). The waveform of the primary voltage V1 shown in FIG. 9 is a waveform obtained in the presence of only the discharge gap defect, during the inspection without the "motoring" of the engine 48, while the waveform of the primary voltage V1 shown in FIG. 10 is a waveform obtained in the presence of only the porcelain defect, during the inspection with the "motoring" of the engine 48. The inspections of the spark plug 10 in the present embodiment are based on a time parameter value Tn and a voltage parameter value Vn, which are indicated in FIGS. 8–10. The time parameter value Tn is a time duration (hereinafter referred to as "voltage measuring time") from a moment at which the primary voltage V1 has been raised to a first threshold VTH1 immediately after the expiration of the time duration TINT, and a moment at which the primary voltage V1 has been lowered down to a second threshold VTH2 after it is once raised above the second threshold VTH2. In the present embodiment, the first threshold value VTH1 is equal to the line voltage Vss, and the second threshold VTH2 is slightly higher than the line voltage Vss. The voltage parameter value Vn is calculated according to the following equation (2), on the basis of a surface area A indicated by hatching in FIGS. 8–10 and the time parameter value Tn:

$$Vn=A/Tn \qquad (2)$$

That is, the voltage parameter value Vn is an average of the primary voltage V1 during the voltage measuring time Tn.

When the spark plug 10 suffers from the discharge gap defect, the primary voltage V1 during the inductive discharge is lower than when the spark plug 10 is normally installed in the engine without the discharge gap defect, as is apparent from FIG. 9. In the presence of the discharge gap defect, the sparking voltage Vs is lowered due to a relatively small size "d" of the discharge gap, as is understood from the above expression (1), and the sparking is likely to take place across the discharge gap, at a relative low level of the primary voltage V1. In the presence of the discharge gap, the time parameter value Tn is larger than in the normally installed state of the spark plug 10, because the duration of the sparking increases with a decrease in the voltage during the inductive discharge, provided that the amount of the electromagnetic energy stored in the primary coil 42 in the time duration TINT is constant. Accordingly, the voltage parameter value Vn which is an average of the primary voltage V1 for the voltage measuring time Tn is smaller in the presence of the discharge gap defect than in the normally installed state of the spark plug 10.

When the spark plug 10 suffers from the porcelain defect, the waveform of the primary voltage V1 has a tendency reversed with respect to that of the waveform in the presence of the discharge gap defect, as shown in FIG. 10. Namely, the primary voltage V1 during the inductive discharge is higher than in the normally installed state of the spark plug 10, and the time parameter value Tn is smaller than in the normally installed state. Accordingly, the voltage parameter value Vn is larger than in the normally installed state. It is again noted that the waveform of FIG. 10 in the presence of the porcelain defect is obtained with the air pressure in the engine cylinder in question being raised by motoring the engine 48, while the waveform of FIG. 9 in the presence of the discharge gap defect is obtained without the "motoring" of the engine 48.

Another parameter value called a shape parameter value Sn is introduced for the inspection. This shape parameter value Sn is expressed by the following equation (3):

$$Sn=Vn/Tn \qquad (3)$$

The shape parameter value Sn is a parameter which generally represents a geometric characteristic of an approximate geometry of the area (surface area A) indicated by hatching in FIGS. 8–10. That is, the area is considered to be a rectangle whose length and width are represented by the time parameter value Tn and the voltage parameter value Vn, respectively. The shape parameter value Sn represents a ratio of the width (Vn) to the length (Tn). This rectangle whose surface area is represented by A is indicated by phantom line (one-dot chain line) in FIGS. 8–10. It will be understood that the shape parameter values Sn of the rectangles shown in FIGS. 8–10 have a relationship indicted by the following inequality (4)

$$Sn \text{ in FIG. } 9 < Sn \text{ in FIG. } 8 < Sn \text{ in FIG. } 10 \qquad (4)$$

Based on this fact, it is possible to detect the presence of the discharge gap defect (FIG. 9) when the shape parameter value Sn is smaller than the value in the normally installed state of the spark plug 10 (FIG. 8), and detect the presence of the porcelain defect (FIG. 10) when the shape parameter value Sn is larger than the value in the normally installed state. The present embodiment is adapted to inspect the spark plug 10 in this way. The inspection may be effected by using only the voltage parameter value Vn in place of the shape parameter value Sn. However, the inspection based on the shape parameter value Sn is preferred to the inspection based on only the voltage parameter value Vn, because the shape parameter value Sn has a higher S/N ratio since it is a ratio of the voltage and time parameter values Vn and Tn which have opposite tendencies of change in the presence of the discharge gap defect and the porcelain defect.

When the engine 48 is not controlled by the "motoring" by the motor 40 as described above, the sparking will take place at the discharge gap, even if there exists the porcelain defect, because the size of the discharge gap is smaller than the distance between the center electrode 12 and the shell 18 through the crack of the porcelain 16. Thus, the sparking will take place at the discharge gap irrespective of the presence or absence of the porcelain defect, when the "motoring" is not effected. Accordingly, the inspection of the spark plug 10 for the discharge gap defect can be achieved with high accuracy irrespective of whether there exists the porcelain gap or not.

When the engine 48 is controlled by the "motoring", on the other hand, that is, when the air pressure in the vicinity of the discharge gap is raised at the time the rectangular pulse MPLS is generated to energize the spark plug 10, the sparking will take place between the center electrode 12 and the shell 18 before the sparking at the discharge gap, if the porcelain has cracks while there does not exist the discharge gap defect. If the size of the discharge gap is smaller than the nominal value due to the discharge gap defect, the sparking will not necessarily take place between the center electrode 12 and the shell 18 before the sparking at the discharge gap. In view of this analysis, the present embodiment is adapted to effect the inspection for the porcelain defect, for only the spark plug 10 which has been found to have the normal discharge gap, in the inspection for the discharge gap defect. The spark plug 10 having the discharge gap defect should be replaced with a new one, irrespective of whether this plug 10 also suffers from the porcelain defect or not. Therefore, the spark plug 10 having the discharge gap defect need not be inspected for the porcelain defect. The spark plug 10 installed in place of the defective spark plug is also subjected to the inspections for the discharge gap defect and the porcelain defect in the manners described above.

Figure 11:
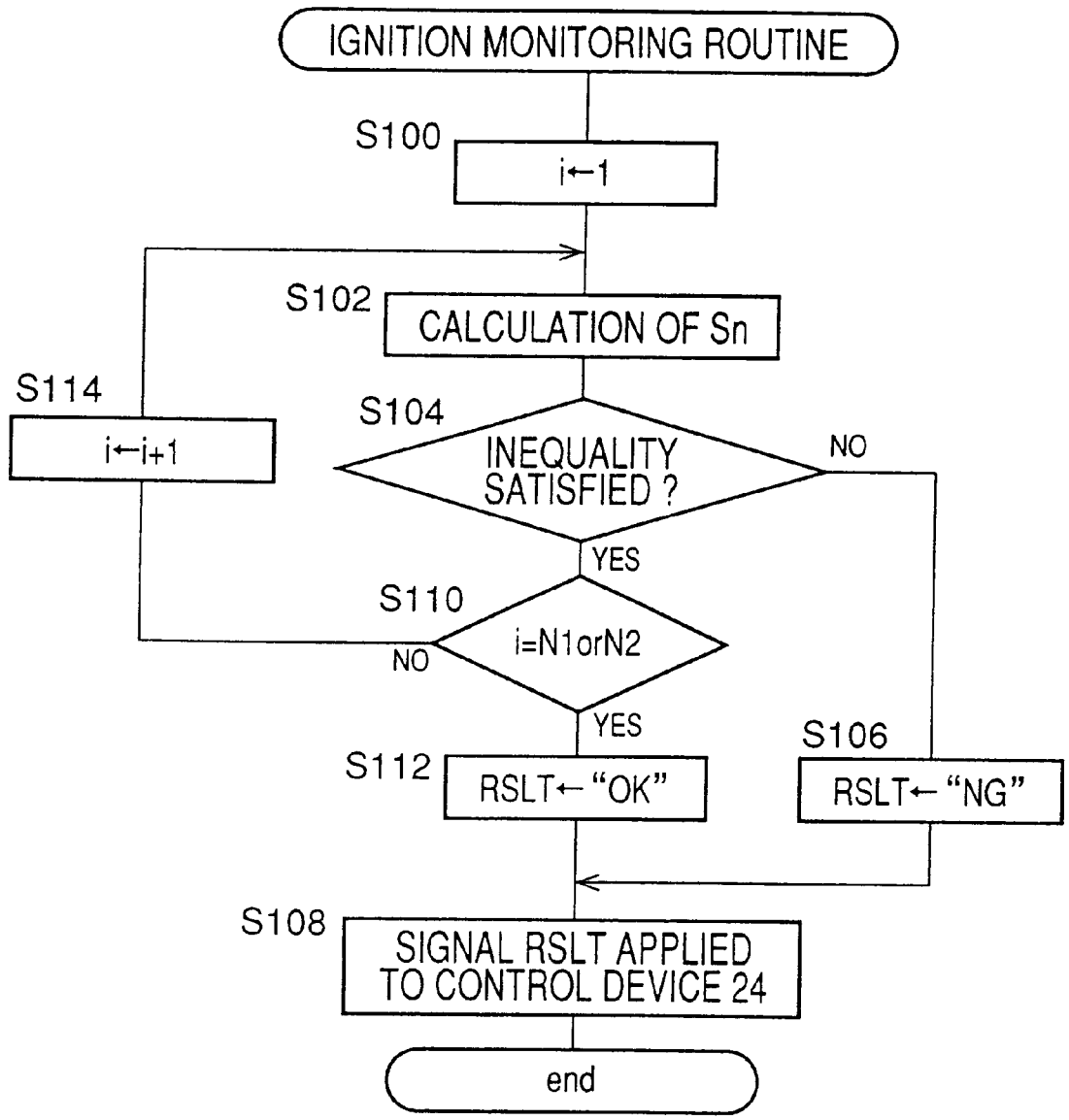
FIG. 11 is a flow chart illustrating an ignition monitoring routine executed by a processing unit of a monitoring device of the inspection system.

The monitoring device 38 is adapted to execute an ignition monitoring routine illustrated in the flow chart of FIG. 11. The monitoring device 38 includes a processing unit, a ROM (read-only memory) and a RAM (random-access memory). The ROM stores an ignition monitoring program according to which the processing unit executes the ignition monitoring routine of FIG. 11 while utilizing temporary data storage function of the RAM. However, the monitoring device 38 may use a magnetic disk or tape or other suitable recording medium which stores various programs including the ignition monitoring program and which is accessible by a suitable retrieving device for storing the retrieved program in the RAM or similar memory when the spark plug 10 is inspected.

The monitoring device 38 executes the ignition monitoring routine of FIG. 11 each time the rectangular pulse MPLS described above is received from the ignition control device 36. The monitoring device 38 includes a suitable waveform obtaining device, which stores the obtained waveforms of the primary voltage V1 in the RAM. When the waveforms are stored in the RAM, the waveforms may be subjected to a smoothing operation described below. The monitoring device 38 receives the above-indicated control signals CTRLJ from the control device 24, immediately before the rectangular pulse MPLS is received from the ignition control device 36. As described below, the ignition monitoring routine executed when the control signal CTRLJ1 is received for the inspection for the discharge gap defect is more or less different from the ignition monitoring routine executed when the control signal CTRLJ2 is received for the inspection for the porcelain defect. Therefore, the control signals CTRLJ should be received before the reception of the rectangular pulse MPLS which triggers the monitoring device 38 to initiate the routine.

The ignition monitoring routine is initiated with step S100 to initiate a counter variable "i". Step S100 is followed by step S102 to calculate the shape parameter value Sn on the basis of the detected waveform of the primary voltage V1 stored in the RAM. Then, the control flow goes to step S104 to effect a determination on the basis of the calculated shape parameter value Sn. Described more specifically, when the monitoring device 38 has received the control signal CTRLJ1 to inspect the spark plug 10 for the discharge gap defect, step S104 is implemented to determine whether the following inequality is satisfied or not:

$$J1 \leftarrow (Sn0-\delta) \leq Sn \tag{5}$$

A decision obtained by the determination is stored as a variable J1. In this inspection for the discharge gap defect, the engine 48 is not controlled by the "motoring" by the motor 40. The value Sn0 is an average of the shape parameter values Sn of a large number of spark plugs 10 which are normally installed in the engine 48. The value "67" is a predetermined positive value, which may be three times a standard deviation a which is calculated when the average value Sn0 is calculated. The value (Sn0-δ) in the inequality (5) may be replaced by a minimum value of the shape parameter values Sn of the large number of spark plugs 10 in the normally installed state. If an affirmative decision (YES) is obtained in step S104, it indicates that the discharge gap of the spark plug 10 under examination is normal. Although the determination according to the inequality (5) is a determination as to whether the discharge gap is smaller than a predetermined lower limit. However, the inequality (5) may be replaced by the following inequality (6) which permits a determination as to whether the size of the discharge gap is held in a predetermined range defined by predetermined lower and upper limits. In this case, the discharge gap whose size is larger than the upper limit (of the discharge gap in the normally installed state of the spark plug) is also determined to be defective.

$$J1' \leftarrow (Sn0-\delta) \leq Sn \leq (Sn0+\delta) \tag{6}$$

In this case, a decision obtained by the determination is stored as a variable J1'.

When the monitoring device 38 has received the control signal CTRLJ2 for the inspection for the porcelain defect, on the other hand, step S104 is implemented to determine whether the following inequality is satisfied:

$$J1 \leftarrow (Sn0-\delta) \leq Sn \tag{7}$$

A decision obtained by this determination is stored as a variable J2. In this inspection for the discharge gap defect, the engine 48 is controlled by the "motoring" by the motor 40.

If a negative decision (NO) is obtained in step S104, that is, if the above-indicated inequality (5) or (6) or inequality (7) is not satisfied, it indicates that there exists the discharge gap defect or the porcelain defect. In this case, the control flow goes to step S106 in which a variable RSLT is set to "NG" indicating that the spark plug 10 is defective in its the discharge gap size or porcelain 16. Then, step S108 is implemented to apply a signal RSLT indicative of the variable RSLT to the control device 24, as indicated in FIG. 4. If an affirmative decision (YES) is obtained in step S104, that is, if the above-indicated inequality (5) or (6) or inequality (7) is satisfied, it indicates that the spark plug 10 is normal in its discharge gap size and the porcelain 16. In this case, the control flow goes to step S110 to determine whether the counter variable "i" is equal to a preset number N1 or N2. The preset number N1 is used for the inspection for the discharge gap defect, while the present number N2 is used for the inspection for the porcelain defect. If an affirmative decision (YES) is obtained in step S110, the control flow goes to step S112 to set the variable RSLT to "OK" indicating that the spark plug 10 is normal. Step S112 is followed by the step S108 described above, and one cycle of execution of the routine is terminated. If a negative decision (NO) is obtained in step Sllo, the control flow goes to step SS4 to increment the counter variable "i" and then to step S102. Steps S102, S104, S110 and S114 are repeatedly implemented until the counter variable "i" has become equal to the preset number N1 or N2.

The control device 24 is adapted to eventually determine that the spark plug 10 under examination is normal, only if the affirmative decision (YES) is consecutively obtained in step S104 the number of times equal to the present number N1. In this respect, it is noted that the affirmative decision (YES) is not necessarily obtained when the discharge gap is abnormally small, because the sparking does not always take place at the smallest gap, namely, at the defective discharge gap. However, if the inspection is repeated a relatively large number of times, there is a high possibility that the affirmative decision (YES) is obtained at least once. This number of time is determined by experiments as the preset number N1. Thus, if the affirmative decision is consecutively obtained in step S104 by the present number Ni of times, it means that the determination that the spark plug 10 is normal in its discharge gap is highly reliable. Accordingly, the present arrangement is effective to avoid erroneous determination that the discharge gap is normal, when the discharge gap is in fact defective. For the same purpose, the inspection for the porcelain defect is repeated by the present number N2 of time, which is also determined by experiments. In the manner described above, the control device 24 determines the state of the spark plug 10 on the basis of the signals RSLT received from the monitoring device 38.

Figure 12:
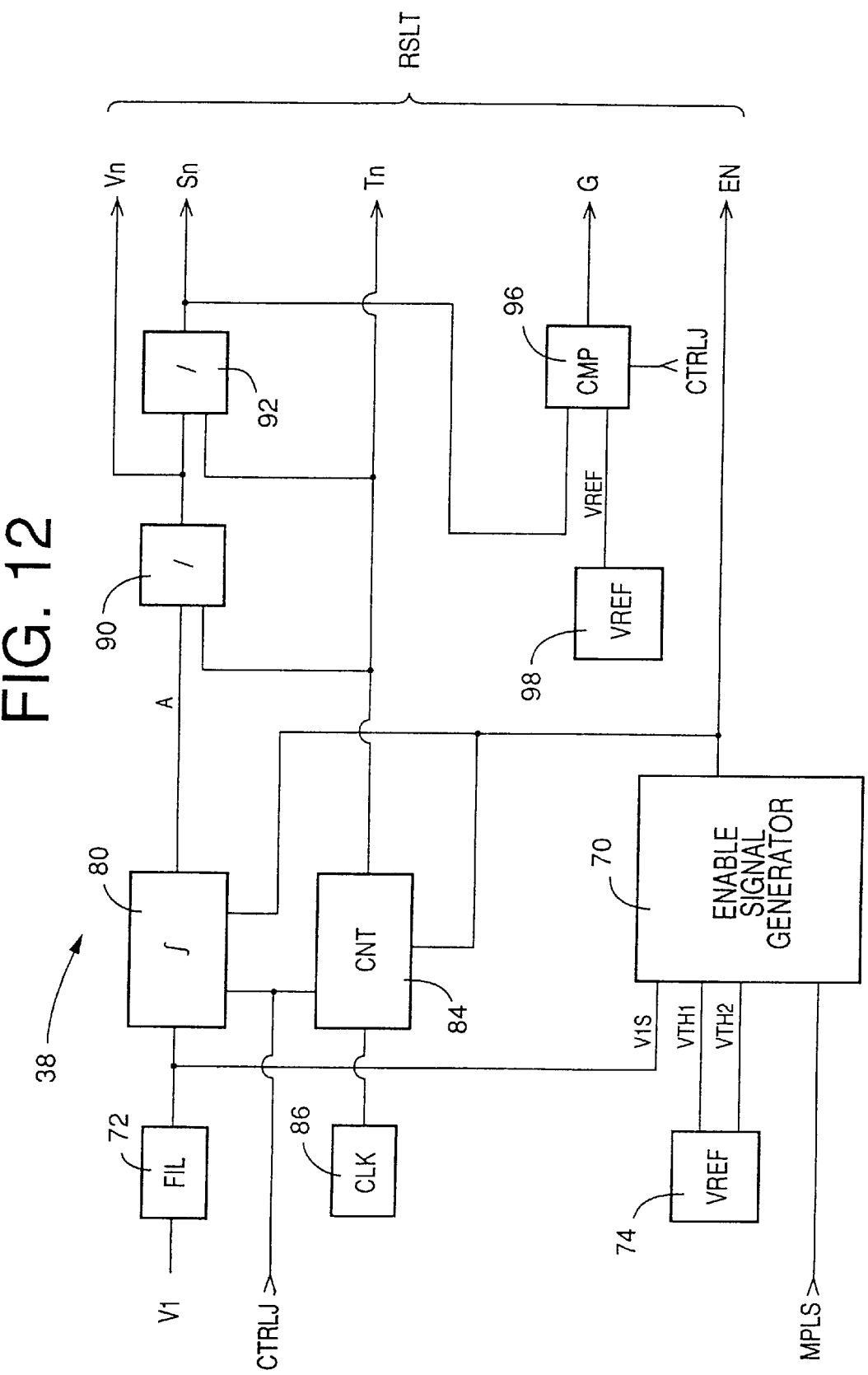
FIG. 12 is a circuit diagram showing an arrangement of a monitoring device of the inspection system according to another embodiment of the invention alternative to that of FIG. 11.

Referring to the circuit diagram of FIG. 12, there is shown an arrangement of the monitoring device 38 according another embodiment of the present invention. The circuity shown in FIG. 12 corresponds to the functions of the processing unit, ROM and RAM which are adapted to execute the ignition monitoring routine of FIG. 11. The present monitoring system 38 of FIG. 12 includes an ENABLE signal generator 70 which generates an ENABLE signal EN which is held "ON" during the voltage measuring time described above, and "OFF" during the other time. The ENABLE signal generator 70 receives a smoothed primary voltage V1S which is the primary voltage V1 whose high-frequency component has been removed by a low-pass filter 72. The generator 70 receives also first and second threshold voltage values VTH1, VTH2 from a constant voltage source 74. The generator 70 is adapted to generate the ENABLE signal EN, by comparing the smoothed primary voltage V1S with the first and second threshold voltage values VTH1, VTH2.

The ENABLE signal EN is turned "ON" when the smoothed primary voltage V1S has been raised to the first threshold value VTH1 for the first time after the reception of the rectangular pulse MPLS, and is turned "OFF" when the smoothed primary voltage V1S has been lowered down to the second threshold VTH2 after it is once raised above the second threshold value VTH2. The thus generated ENABLE signal EN is applied to an integrator 80 and a counter 84. The integrator 80 integrates the smoothed primary voltage V1S while the ENABLE signal EN is held "ON", and the counter 84 counts the number of clock pulses received from a clock 86 while the ENABLE signal EN is held "ON". The integrator 80 and counter 84 are reset to "zero" upon reception of the control signal CTRLJ from the control device 24. The output of the integrator 80 corresponds to the surface area A indicated by hatching in FIGS. 8–10, and the output of the counter 84 corresponds to the time parameter value Tn. Accordingly, these outputs are expressed by the surface area A and time parameter value Tn.

The output of the integrator 80 in the form of the surface area A and the output of the counter 84 in the form of the time parameter value Tn are applied to a divider 90, which calculates a voltage parameter value Vn (=A/Tn) on the basis of the values A and Tn. The output of the divider 90 in the form of the voltage parameter value Vn and the output of the counter 84 in the form of the time parameter value Tn are applied to a divider 92, which calculates the shape parameter value Sn (=Vn/Tn) on the basis of the values Vn and Tn. The shape parameter value Sn is applied to a comparator 96, which compares the shape parameter value Sn and an output voltage VREF of a constant voltage source 98. The comparator 97 generates an output G indicative of a result of the comparison. The voltage VREF is a predetermined voltage value corresponding to an average of the shape parameter values Sn of the spark plugs 10 in the normally installed state. The average of the shape parameter values Sn is obtained when the engine 48 is at rest without the "motoring" control (with the cylinder bores held at the atmospheric pressure), and also when the engine 48 is controlled by the "motoring" by the motor 40 so that the pressures in the cylinder bores are raised as described above. An appropriate one of these two average values of the shape parameter values Sn is selected by the constant voltage source 98 depending upon the received control signal CTRLJ (CTRLJ1 or CTRLJ2), to determine the voltage VREF corresponding to the selected average. When the average values of the shape parameter values Sn are obtained, the standard deviation values a of the values Sn are also obtained. The comparator 96 selects one of these standard deviation values a depending upon the received control signal CTRLJ (depending upon whether the engine is "motored" or not), and effects the comparison of the shape parameter value Sn and the voltage VREF, while taking into account a value which is three time the selected standard deviation σ.

Based on the shape parameter Sn, voltage VREF and control signal CTRLJ, the comparator 96 generates the output G corresponding to the variable J1 (J1') or J2 described by reference to the flow chart of FIG. 11. Where the control signal CTRLJ is the signal CTRLJ1, a determination as to whether the following inequality (8) or (9) is satisfied is effected:

$$G1 \leftarrow (VREF - 3\cdot\sigma) \leq Sn \quad (8)$$

$$G1' \leftarrow (VREF - 3\cdot\sigma) \leq Sn \leq (VREF + 3\cdot\sigma) \quad (9)$$

A decision obtained by this determination is stored as the output G in the form of a variable G1 or G1'. The inequalities (8) and (9) correspond to the above-indicated inequalities (5) and (6), respectively. Where the control signal CTRLJ is the signal CTRLJ2, a determination as to whether the following inequality (10) is satisfied is effected:

$$G2 \leftarrow (VREF + 3\cdot\sigma) \quad (10)$$

A decision obtained by this determination is stored as the output G in the form of a variable G2. The above inequality (10) corresponds to the above-indicated inequality (7). If an affirmative decision (YES) is obtained in the determination, it means that the spark plug 10 under examination is normally installed in the engine 48.

The monitoring device 38 is capable of generating the signal RSLT indicative of the ENABLE signal EN, time parameter value Tn, voltage parameter value Vn and output G, as indicated in FIG. 12. The control device 24 determines whether the spark plug 10 under examination is normal or defective, on the basis of the output G. The control device 24 receives the output G for one inspection of the spark plug 10, immediately after the ENABLE signal EN has been changed from the "ON" state to the "OFF" state. For accurate inspection of the spark plug 10, it is required to repeat the inspection the predetermined numbers of times N1, N2 for checking the spark plug for the discharge gap defect and the porcelain defect, so that the control device 24 determines that the spark plug 10 is normal, only if the affirmative decision (YES) is obtained the predetermined numbers of times N1, N2 consecutively, as in the embodiment of FIG. 11.

A further embodiment of the invention will be described by reference to FIGS. 13–15. In this embodiment, the spark plug is inspected on the basis of a quantity relating to only the level of the primary voltage V1.

Figure 13:
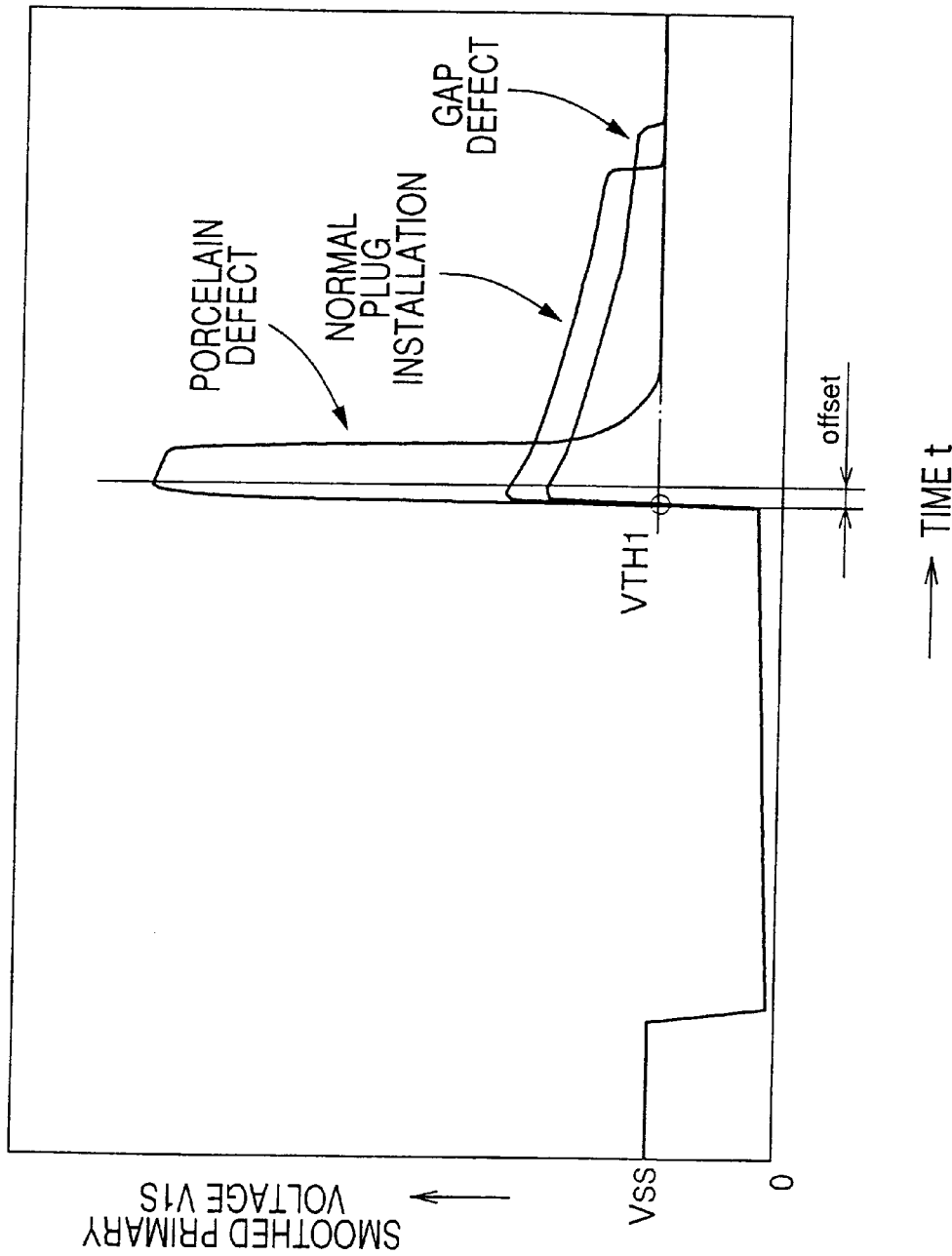
FIG. 13 is a graph indicating waveforms of a primary voltage obtained in a normally installed state of the spark plug, and in defective states of the discharge gap and the porcelain of the spark plug, respectively.

The graph o FIG. 13 is a graph wherein the waveforms of the primary voltage V1 shown in FIGS. 8, 9 and 10 are superimposed on each other. The waveforms shown in FIG. 13, however, are the waveforms after they have been smoothed by a suitable hardware device such as the low-pass filter 72 shown in FIG. 12, or by a software processing equivalent to the processing by such a hardware device. Based on the thus smoothed waveforms of the primary voltage V1 (referred to as "smoothed primary voltage V1S" as in the embodiment of FIG. 12), the processing for the inspection can be made easier and more accurate. In the present embodiment of FIG. 13, the inspection of the spark plug 10 is effected on the basis of the smoothed primary voltage V1S a predetermined time after the smoothed primary voltage V1S has been raised to the first threshold VTH1. The predetermined time is represented by a variable "offset". Since the present embodiment does not use the time parameter value Tn, the second threshold VTH2 used in the preceding embodiment is not used for the inspection.

The variable "offset" is set to a value corresponding to a time period during which the discharge occurring on the spark plug is substantially capacitive. This time period can be empirically determined. As is apparent from the graph of FIG. 13, the rate of decrease of the smoothed primary voltage V1S during the period of the substantially inductive discharge is comparatively low. Further, the rate of decrease of the smoothed primary voltage V1S generally decreases as the time passes during the period of the inductive discharge. Immediately before the end of the period of the substantially inductive discharge, however, the rate of decrease of the value V1S increases. In the present embodiment, the inspection of the spark plug 10 is effected based on an average (meanV1S) of the level of the smooth primary voltage V1S while the rate of decrease of the smoothed primary voltage V1S continues to generally decrease. As is apparent from the graph of FIG. 13, the average meanV1S is the smallest in the presence of the discharge gap defect, and the largest in the presence of the porcelain defect, while it is intermediate in the normally installed state of the spark plug.

In the present embodiment, an ignition monitoring routine illustrated in the flow chart of FIG. 14 is executed in place of the routine of FIG. 11. The routine of FIG. 14 is formulated to inspect the spark plug 10 on the basis of the average meanV1S of the smoothed primary voltage V1S. The ignition monitoring routine 14 is executed by the monitoring device 38 similar to that adapted to execute the routine of FIG. 11.

The ignition monitoring routine of FIG. 14 is initiated with step S200 to reset the variable "i" to zero. Then, step S202 is implemented to execute a sub-routine for calculating the average meanV1S. This sub-routine will be explained by reference to the flow chart of FIG. 15. Then, the control flow goes to step S204 to determine whether the following inequality (11) is satisfied or not:

$$J3 \leftarrow (\text{meanV1S0}-\delta) \leq \text{meanV1S} \leq (\text{meanV1S})+\delta) \quad (11)$$

A decision obtained in this determination is stored as a variable J3. The value "meanV1S0" is an average of the average values meanV1S of a large number of spark plugs normally installed in the engine 48. The variable "σ" is a value three times the standard deviation σ calculated when the average meansV1S0 is calculated. In the present embodiment, the above-indicated inequality (11) is used for inspecting the spark plug for both the discharge gap defect and the porcelain defect. If a negative decision (NO) is obtained in step S204, it indicates that there exists the discharge gap defect or the porcelain defect. In the inspection for the discharge gap defect, the engine 48 is held at rest without the "motoring" by the motor 40. In the inspection for the porcelain defect, the engine 48 is controlled by the "motoring" by the motor 40 to raise the cylinder pressure when the rectangular pulse MPLS is generated.

If the negative decision (NO) is obtained in step S204, the control flow goes to steps S206 and S208 similar to steps S106 and S108 of FIG. 11, and one cycle of execution of the routine of FIG. 14 is terminated. If an affirmative decision (YES) is obtained in step S204, the control flow goes to step S210 to determine whether the variable "i" is equal to the predetermined number N1 or N2. If an affirmative decision (YES) is obtained in step S210, the control flow goes to step S212 and S208 similar to step S112 and S208 of FIG. 11, and one cycle of execution of the routine is terminated. If a negative decision (NO) is obtained in step S210, the control flow goes to step S214 to increment the variable "i". Then, steps S202, S204, S210, S214 are repeatedly implemented until the affirmative decision is obtained in step S210.

The sub-routine for calculating the average meansV1S is executed in step S202 according to the flow chart illustrated in FIG. 15. This sub-routine is initiated with step S300 to set a variable "j" to the variable "offset", and reset a variable "ΣV1S" and a variable "n" to zero. Then, step S302 is implemented to add the smoothed primary voltage V1S[j] to the variable "ΣV1S". Then, the control flow goes to step S304 to increment the variable "n". The variable "j" is equal to "0" at the moment when the smoothed primary voltage V1S has been raised to the threshold value VTH1 indicated in FIG. 13. The values of the smoothed primary voltage V1S[j] obtained after the voltage V1S has been raised to the threshold value VTH1 until the voltage V1S has been stabilized at the line voltage Vss are successively obtained and stored in the RAM of the monitoring device 38.

Then, step S307 is implemented to calculate a variable ΔV1S1 and a variable ΔV1S2 according to the following equations (12) and (13):

$$\Delta V1S = V1S[j+\text{step}] - V1S[j] \quad (12)$$

$$\Delta V2S = V1S[j+2\cdot\text{step}] - V1S[j+\text{step}] \quad (13)$$

The variable ΔV1S corresponds to the rate of decrease of the smoothed primary voltage V1S at a point of time indicated by the variable "j". On the other hand, the variable ΔV2S corresponds to the rate of change of the smoothed primary voltage V1S at a point of time which is later than the point of time indicated by the variable "j" by a time indicated by a variable "step".

The control flow then goes to step S308 to determine whether the variable ΔV1S1 is equal to or smaller than a value (ΔV1S2+α). The value "α" is a predetermined variable. If an affirmative decision (YES) is obtained in step S308, the control flow goes to step 310 to add the variable "step" to the variable "j", and goes back to step S302. Steps S302, S304, S306, S308 and S310 are repeatedly implemented until a negative decision (NO) is obtained in step S308. The affirmative decision (YES) obtained in step S308 indicates that the rate of decrease of the smoothed primary voltage V1S is smaller than a predetermined value. If the negative decision (NO) is obtained in step S308, it indicates that the smoothed primary voltage V1S has begun to increase, namely, it indicates that the period of the inductive discharge is about to be terminated. In this case, the control flow goes to step S312 to calculate the average meanV1S according to the following equation (14):

$$\text{meanV1S} = \Sigma V1S/n \quad (14)$$

Thus, the method of inspecting the spark plug according to the present embodiment does not require the use of a quantity corresponding to the time parameter Tn used in the preceding embodiments. It is noted that the variable "α" used in step S308 is a predetermined value not smaller than zero. While the accuracy of detection of the termination of the inductive discharge period deteriorates with an increase of this variable "α", the use of the variable "α" is effective to prevent an erroneous error due to a noise introduced in the detected primary voltage V1S.

It will be understood from the foregoing descriptions, the illustrated embodiments are adapted to detect various voltage-related quantities such as the primary voltage V1, smoothed primary voltage V1S, surface area A, voltage parameter value Vn. shape parameter value Sn, secondary voltage V2, variables ΔV1S1, 66 V1S2 and variable ΣV1S.

While the several preferred embodiments of the invention have been described for illustrated purpose only, it is to be understood that the present invention may be embodied with various changes and improvements, without departing from the scope of the invention defined in the following claims.

INDUSTRIAL APPLICABILITY

As described above, the method and apparatus according to the present invention permit accurate inspection of a spark plug for the presence of defects while the spark plug is installed in an engine.

What is claimed is:

1. A method of inspecting a spark plug while the spark plug is installed in an engine, said method comprising the steps of:
   applying to said spark plug a voltage high enough to cause said spark plug to generate a spark, while said engine is held at rest and without supplying said engine with a fuel;
   obtaining at least one voltage-related quantity relating to said voltage applied to said spark plug; and
   determining a state of said spark plug on the basis of said at least one voltage-related quantity.

2. A method according to claim 1, wherein said spark plug is energized by application of said voltage thereto while a pressure in a cylinder of said engine containing the spark plug is held at an atmospheric level.

3. A method according to claim 1, wherein said spark plug is energized by application of said voltage thereto while a pressure in a cylinder of said engine containing the spark plug is held at a level higher than an atmospheric pressure.

4. A method according to claim 3, wherein the pressure in said cylinder is substantially equal to a pressure in said cylinder when an air-fuel mixture in said cylinder is ignited by combustion of a fuel during normal operation of said engine.

5. A method according to claim 4, wherein compressed air is introduced into said cylinder.

6. A method according to claim 1, wherein said spark plug is energized with a secondary voltage generated by a voltage applying device on the basis of a primary voltage lower than said secondary voltage, and said at least one voltage-related quantity includes at least one quantity relating to at least one of said primary and secondary voltages.

7. A method according to claim 6, wherein said at least one quantity includes a time duration (Tn) of a discharge which occurs on the spark plug energized to produce said spark.

8. A method according to claim 7, wherein said at least one quantity includes an average (Vn) of said at least one of said primary and secondary voltages.

9. A method according to claim 8, wherein said at least one quantity includes a ratio (Sn) of said average to said time duration (Tn) of said discharge.

10. A method according to claim 6, wherein said step of obtaining at least one voltage-related quantity comprises detecting said primary voltage, and obtaining said at least one quantity relating to said primary voltage.

11. A method according to claim 10, wherein said at least one quantity relating to said primary voltage comprises an average of said primary voltage.

12. A method according to claim 11, wherein said at least one quantity relating to said primary voltage comprises a time duration of a discharge which occurs on said spark plug energized to generate said spark.

13. A method according to claim 12, wherein said at least one quantity relating to said primary voltage comprises a ratio of said average to said time duration.

14. A method according to claim 10, wherein said spark plug is energized by an external voltage applying device.

15. A method according to claim 10, wherein said spark plug is energized with said secondary voltage while a pressure in a cylinder of said engine in which said spark plug is installed is held at an atmospheric level.

16. A method according to claim 15, wherein said spark plug is energized with said secondary voltage while said engine is held at rest.

17. A method according to 10, wherein said spark plug is energized with said secondary voltage while a pressure in a cylinder of said engine in which said spark plug is installed is held at a level higher than an atmospheric level.

18. A method according to claim 17, wherein said spark plug is energized with said secondary voltage while said engine is operated by an external drive device.

19. A method according to claim 17, wherein said spark plug is energized by said secondary voltage while a piston of said engine is located at a top dead center thereof.

20. A method according to claim 17, wherein said spark plug is energized with said secondary voltage while compressed air is introduced into said cylinder while said engine is held at rest.

21. A method of inspecting a spark plug while the spark plug is installed in an engine, said method comprising the steps of:
   energizing said spark plug with a secondary voltage generated on the basis of a primary voltage lower than said secondary voltage, without supplying said engine with fuel, such that said secondary voltage is high enough to cause said spark plug to generate a spark;
   detecting said primary voltage;
   obtaining at least one quantity relating to said primary voltage; and
   determining a state of said spark plug on the basis of said at least one quantity.

* * * * *